US010252600B2

(12) United States Patent
Miyakoshi et al.

(10) Patent No.: US 10,252,600 B2
(45) Date of Patent: Apr. 9, 2019

(54) AIR-CONDITIONING APPARATUS FOR VEHICLE

(71) Applicant: SANDEN HOLDINGS CORPORATION, Isesaki-shi, Gunma (JP)

(72) Inventors: Ryo Miyakoshi, Isesaki (JP); Kenichi Suzuki, Isesaki (JP); Kouhei Yamashita, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 95 days.

(21) Appl. No.: 15/513,843

(22) PCT Filed: Sep. 18, 2015

(86) PCT No.: PCT/JP2015/076667
§ 371 (c)(1),
(2) Date: Mar. 23, 2017

(87) PCT Pub. No.: WO2016/047590
PCT Pub. Date: Mar. 31, 2016

(65) Prior Publication Data
US 2017/0282689 A1    Oct. 5, 2017

(30) Foreign Application Priority Data

Sep. 24, 2014    (JP) ................. 2014-193750

(51) Int. Cl.
*B60H 1/32*        (2006.01)
*F25B 49/02*       (2006.01)
(Continued)

(52) U.S. Cl.
CPC ....... *B60H 1/3208* (2013.01); *B60H 1/00007* (2013.01); *B60H 1/00921* (2013.01);
(Continued)

(58) Field of Classification Search
CPC .............. B60H 1/3208; B60H 1/00007; B60H 1/00921; B60H 1/3207; B60H 1/3211;
(Continued)

(56) References Cited

U.S. PATENT DOCUMENTS 5,299,431 A * 4/1994 Iritani ................ B60H 1/00021
62/159
5,433,266 A * 7/1995 Doi ..................... B60H 1/00821
165/202

(Continued)

FOREIGN PATENT DOCUMENTS

CN    102874068 A    1/2013
CN    103348198 A    10/2013
(Continued)

OTHER PUBLICATIONS

Japan Patent Office; International Search Report issued in International Application No. PCT/JP2015/076667, dated Dec. 22, 2015.
(Continued)

*Primary Examiner* — Tho V Duong
(74) *Attorney, Agent, or Firm* — Baker Botts L.L.P.

(57) ABSTRACT

There is disclosed an air-conditioning apparatus for vehicle which is capable of selecting an appropriate operation mode while inhibiting the operation mode from being unnecessarily changed, and achieving rapid and stable vehicle interior air conditioning. A controller has respective operation modes of a heating mode, a dehumidifying and heating mode, a dehumidifying and cooling mode, and a cooling mode, and selects and executes these operation modes. The controller has a dehumidifying and heating mode maximum radiator temperature MAP and a dehumidifying and cooling mode maximum radiator temperature MAP. The controller selects an operation mode in which a radiator target temperature TCO is achievable by heat radiation in a radiator 4
(Continued)

with reference to each MAP, on startup or at a time of change of the operation mode.

12 Claims, 12 Drawing Sheets

(51) Int. Cl.
*F25B 41/04* (2006.01)
*B60H 1/00* (2006.01)
*F25B 5/04* (2006.01)
*F25B 6/04* (2006.01)
*F25B 40/00* (2006.01)

(52) U.S. Cl.
CPC ......... *B60H 1/3207* (2013.01); *B60H 1/3211* (2013.01); *B60H 1/3213* (2013.01); *F25B 41/04* (2013.01); *F25B 49/02* (2013.01); *B60H 2001/3261* (2013.01); *F25B 5/04* (2013.01); *F25B 6/04* (2013.01); *F25B 40/00* (2013.01); *F25B 2400/0403* (2013.01); *F25B 2400/0409* (2013.01); *F25B 2400/0411* (2013.01); *F25B 2400/0417* (2013.01); *F25B 2600/2501* (2013.01); *F25B 2700/195* (2013.01); *F25B 2700/197* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01); *F25B 2700/21163* (2013.01); *F25B 2700/21173* (2013.01)

(58) Field of Classification Search
CPC .............. B60H 1/00642; B60H 1/0083; B60H 1/32135; B60H 1/00835; B60H 1/3213; F25B 41/04; F25B 49/02
See application file for complete search history.

(56) References Cited

U.S. PATENT DOCUMENTS

| 5,518,065 | A | * | 5/1996 | Asou | B60H 1/00814 165/43 |
| 5,605,051 | A | * | 2/1997 | Iritani | B60H 1/3211 62/160 |
| 5,971,845 | A | * | 10/1999 | Echigoya | B60H 1/00735 454/121 |
| 6,076,593 | A | * | 6/2000 | Takagi | B60H 1/00914 165/201 |
| 9,188,350 | B2 | * | 11/2015 | Choi | B60H 1/00 |
| 2011/0167850 | A1 | * | 7/2011 | Itoh | B60H 1/00914 62/160 |

FOREIGN PATENT DOCUMENTS

| JP | H09-295507 A | 11/1997 |
| JP | H09-295508 A | 11/1997 |
| JP | 10-264647 A | 10/1998 |
| JP | 2014-094671 A | 5/2014 |
| JP | 2014-094673 A | 5/2014 |

OTHER PUBLICATIONS

The State Intellectual Property Office of the People's Republic of China, The First Office Action issued in Chinese Application No. CN 201580050845.4, dated Jul. 16, 2018.

* cited by examiner

US 10,252,600 B2

AIR-CONDITIONING APPARATUS FOR VEHICLE

CROSS-REFERENCE TO RELATED APPLICATIONS

This application is a U.S. National Stage Patent Application under 37 U.S.C. § 371 of International Patent Application No. PCT/JP2015/076667, filed on Sep 18, 2015, which claims the benefit of Japanese Patent Application No. JP 2014-193750, filed on Sep 24, 2014, the disclosures of each of which are incorporated herein by reference in their entirety.

TECHNICAL FIELD

The present invention relates to an air-conditioning apparatus of a heat pump system which conditions air in a vehicle interior, and more particularly, it relates to an air-conditioning apparatus which is applicable to a hybrid car or an electric car.

BACKGROUND ART

Due to actualization of environmental problems in recent years, hybrid cars and electric cars have spread. Further, as an air-conditioning apparatus which is applicable to such a vehicle, there has been developed an air-conditioning apparatus which includes a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed outside a vehicle interior to let the refrigerant radiate or absorb heat, and which is capable of changing a heating mode to let the refrigerant discharged from the compressor radiate heat in the radiator and let the refrigerant by which heat has been radiated in this radiator absorb heat in the outdoor heat exchanger, a dehumidifying and heating mode to let the refrigerant discharged from the compressor radiate heat in the radiator and let the refrigerant by which heat has been radiated in the radiator absorb heat only in the heat absorber or in the heat absorber and the outdoor heat exchanger, a cooling mode to let the refrigerant discharged from the compressor radiate heat in the outdoor heat exchanger and let the refrigerant absorb heat in the heat absorber, and a dehumidifying and cooling mode to let the refrigerant discharged from the compressor radiate heat in the radiator and the outdoor heat exchanger and let the refrigerant absorb heat in the heat absorber (e.g., see Patent Document 1).

Here, a conventional air-conditioning apparatus for vehicle selects and changes respective operation modes of the above heating mode, dehumidifying and heating mode, cooling mode and dehumidifying and cooling mode in accordance with a combination of an outdoor air temperature Tam at this time and a target outlet temperature TAO (a target value of a temperature of the air to be blown out to the vehicle interior).

On the other hand, depending on an environment of a vehicle or a condition such as a predetermined temperature, an optimum operation mode is present in the air-conditioning apparatus, but there has been the problem that the optimum operation mode is not necessarily selected in such conventional change control. To eliminate such a problem, in Patent Document 1, the operation mode is changed depending on whether heat radiation in the radiator or heat absorption in the heat absorber becomes excessive or runs short, or the like.

CITATION LIST

Patent Documents

Patent Document 1: Japanese Patent Application Publication No. 2014-94671

SUMMARY OF THE INVENTION

Problems to be Solved by the Invention

However, for example, when a heating mode changes to a dehumidifying and heating mode, depending on an environment of a vehicle or a condition such as a predetermined temperature, a radiator target temperature which is a targeted temperature of a radiator might not be achievable in heat radiation in the radiator in the dehumidifying and heating mode. This also applies when the dehumidifying and heating mode changes to the dehumidifying and cooling mode, and in such a case, there has been the problem that a heating capability (heating) by the radiator runs short and the operation mode immediately returns to the original operation mode (when changing to the dehumidifying and heating mode, the mode returns to the heating mode in which the heating capability is higher, and when changing to a dehumidifying and cooling mode, the mode returns to the dehumidifying and heating mode in which the heating capability is higher) and afterward the change of the operation mode frequently repeats. Then, there has been the problem that it eventually becomes difficult to exert a desirable air conditioning performance and that comfortable vehicle interior air conditioning is not achievable.

The present invention has been developed to solve such a conventional technical problem, and an object thereof is to provide an air-conditioning apparatus for vehicle which is capable of selecting an appropriate operation mode while inhibiting the operation mode from being unnecessarily changed, and achieving rapid and stable vehicle interior air conditioning.

Means for Solving the Problems

An air-conditioning apparatus for vehicle of the present invention includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, and control means, the air-conditioning apparatus for vehicle has at least respective operation modes of a heating mode in which the control means lets the refrigerant discharged from the compressor radiate heat in the radiator, decompresses the refrigerant by which heat has been radiated, and then lets the refrigerant absorb heat in the outdoor heat exchanger, a dehumidifying and heating mode in which the control means lets the refrigerant discharged from the compressor radiate heat in the radiator, decompresses the refrigerant by which heat has been radiated, and then lets the refrigerant absorb heat only in the heat absorber or in this heat absorber and the outdoor heat exchanger, a dehumidifying and cooling mode in which the control means lets the refrigerant discharged from the compressor radiate heat in the radiator and the outdoor heat exchanger, decompresses the refrigerant by which heat has been radiated, and then lets the refrigerant absorb heat in the heat absorber, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, the air-conditioning apparatus for vehicle selects and executes these operation modes, and the air-conditioning apparatus for vehicle is characterized in that the control means selects the operation mode in which a radiator target temperature is achievable by the heat radiation in the radiator.

The air-conditioning apparatus for vehicle of a particular embodiment is characterized in that in the above invention, the control means selects each operation mode to start up, on the basis of an outdoor air temperature and a target outlet temperature, and when the operation mode to be selected on startup is the dehumidifying and heating mode, the control means starts up in the heating mode in a case where the radiator target temperature is not achievable by the heat radiation in the radiator in the dehumidifying and heating mode.

The air-conditioning apparatus for vehicle of a particular embodiment is characterized in that in the above respective inventions, the control means selects each operation mode to start up, on the basis of an outdoor air temperature and a target outlet temperature, and when the operation mode to be selected on startup is the dehumidifying and cooling mode, the control means starts up in the dehumidifying and heating mode in a case where the radiator target temperature is not achievable by the heat radiation in the radiator in the dehumidifying and cooling mode.

The air-conditioning apparatus for vehicle of a particular embodiment is characterized in that in the above respective inventions, the control means changes each operation mode on the basis of an outdoor air temperature and an outdoor air humidity, whether the heat radiation in the radiator becomes excessive or runs short, or whether the heat absorption in the heat absorber becomes excessive or runs short, and when changing the operation mode, the control means allows the change of the operation mode on conditions that the radiator target temperature is achievable by the heat radiation in the radiator in the operation mode after shift.

The air-conditioning apparatus for vehicle of a particular embodiment is characterized in that in the above invention, the control means shifts to the dehumidifying and heating mode on conditions that the radiator target temperature is achievable by the heat radiation in the radiator in the dehumidifying and heating mode, in a case where the outdoor air temperature and the outdoor air humidity rise in the heating mode.

The air-conditioning apparatus for vehicle of a particular embodiment is characterized in that in embodiments disclosed above, the control means shifts to the heating mode in a case where the outdoor air temperature lowers in the dehumidifying and heating mode or a case where the radiator target temperature is not achievable by the heat radiation in the radiator in the dehumidifying and heating mode.

The air-conditioning apparatus for vehicle of a particular embodiment is characterized in that in embodiments disclosed above, the control means shifts to the dehumidifying and cooling mode on conditions that the radiator target temperature is achievable by the heat radiation in the radiator in the dehumidifying and cooling mode, in a case where the heat absorption in the heat absorber runs short or a case where the heat radiation in the radiator becomes excessive, in the dehumidifying and heating mode.

The air-conditioning apparatus for vehicle of a particular embodiment is characterized in that in the above invention, the air-conditioning apparatus for vehicle has an internal cycle mode in which the control means obstructs inflow of the refrigerant into the outdoor heat exchanger and lets the refrigerant absorb heat only in the heat absorber in the dehumidifying and heating mode, the control means shifts to the internal cycle mode in a case where the heat absorption in the heat absorber runs short or a case where the heat radiation in the radiator becomes excessive, in the dehumidifying and heating mode, and the control means shifts to the dehumidifying and cooling mode on conditions that the radiator target temperature is achievable by the heat radiation in the radiator in the dehumidifying and cooling mode, in a case where the heat absorption in the heat absorber further runs short or a case where the heat radiation in the radiator further becomes excessive, in this internal cycle mode.

The air-conditioning apparatus for vehicle of a particular embodiment is characterized in that in embodiments disclosed above, the control means shifts to the dehumidifying and heating mode in a case where the heat radiation in the radiator runs short in the dehumidifying and cooling mode or a case where the radiator target temperature is not achievable by the heat radiation in the radiator in the dehumidifying and cooling mode.

The air-conditioning apparatus for vehicle of a particular embodiment is characterized in that in the above invention, the air-conditioning apparatus for vehicle has an internal cycle mode in which the control means obstructs inflow of the refrigerant into the outdoor heat exchanger and lets the refrigerant absorb heat only in the heat absorber in the dehumidifying and heating mode, and the control means shifts to the internal cycle mode in a case where the heat radiation in the radiator runs short in the dehumidifying and cooling mode or a case where the radiator target temperature is not achievable by the heat radiation in the radiator in the dehumidifying and cooling mode, and the control means shifts to the dehumidifying and heating mode in a case where the heat radiation in the radiator runs short or a case where the heat absorption in the heat absorber becomes excessive, in the internal cycle mode.

The air-conditioning apparatus for vehicle of a particular embodiment is characterized in that in the above invention, the air-conditioning apparatus for vehicle has an outdoor expansion valve which decompresses the refrigerant flowing into the outdoor heat exchanger, and the control means controls a capability of the compressor on the basis of a temperature of the heat absorber and controls a valve position of the outdoor expansion valve on the basis of a temperature or a pressure of the radiator, in at least the dehumidifying and cooling mode, and the control means executes a radiator temperature prior mode to increase the capability of the compressor in a case where the heat radiation in the radiator runs short in the dehumidifying and cooling mode, and the control means shifts to the internal cycle mode in a case where the heat radiation in the radiator runs short in this radiator temperature prior mode or a case where the radiator target temperature is not achievable by the heat radiation in the radiator in the dehumidifying and cooling mode.

The air-conditioning apparatus for vehicle of a particular embodiment is characterized in that in the above respective inventions, the control means has pieces of maximum radiator temperature data concerning a maximum radiator temperature that is achievable by the heat radiation in the radiator for at least each air volume of the radiator and outdoor air temperature in each of the dehumidifying and heating mode and the dehumidifying and cooling mode, and on the basis of these pieces of the maximum radiator temperature data, the control means judges whether or not the radiator target temperature is achievable by the heat radiation in the radiator in the dehumidifying and heating mode and the dehumidifying and cooling mode.

Advantageous Effect of the Invention

According to the present invention, an air-conditioning apparatus for vehicle includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, and control means, the air-conditioning apparatus for vehicle has at least respective operation modes of a heating mode in which the control means lets the refrigerant discharged from the compressor radiate heat in the radiator, decompresses the refrigerant by which heat has been radiated, and then lets the refrigerant absorb heat in the outdoor heat exchanger, a dehumidifying and heating mode in which the control means lets the refrigerant discharged from the compressor radiate heat in the radiator, decompresses the refrigerant by which heat has been radiated, and then lets the refrigerant absorb heat only in the heat absorber or in this heat absorber and the outdoor heat exchanger, a dehumidifying and cooling mode in which the control means lets the refrigerant discharged from the compressor radiate heat in the radiator and the outdoor heat exchanger, decompresses the refrigerant by which heat has been radiated, and then lets the refrigerant absorb heat in the heat absorber, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, the air-conditioning apparatus for vehicle selects and executes these operation modes, and the air-conditioning apparatus for vehicle is characterized in that the control means selects the operation mode in which a radiator target temperature is achievable by the heat radiation in the radiator. Therefore, it is possible to perform comfortable vehicle interior air conditioning in the operation mode in which a heating capability in the radiator can be acquired.

For example, as in an embodiment disclosed above, the control means selects each operation mode to start up, on the basis of an outdoor air temperature and a target outlet temperature, and in this case, when the operation mode to be selected on startup is the dehumidifying and heating mode, the control means starts up in the heating mode in a case where the radiator target temperature is not achievable by the heat radiation in the radiator in the dehumidifying and heating mode. Consequently, it is possible to start rapid and comfortable vehicle interior air conditioning with a sufficient heating capability by the radiator.

Furthermore, as in an embodiment disclosed above, when the operation mode to be selected on startup is the dehumidifying and cooling mode, the control means starts up in the dehumidifying and heating mode in a case where the radiator target temperature is not achievable by the heat radiation in the radiator in the dehumidifying and cooling mode. Consequently, it is possible to start the rapid and comfortable vehicle interior air conditioning with the sufficient heating capability by the radiator.

Furthermore, as in an embodiment disclosed above, the control means changes each operation mode on the basis of an outdoor air temperature and an outdoor air humidity, whether the heat radiation in the radiator becomes excessive or runs short, or whether the heat absorption in the heat absorber becomes excessive or runs short, and in this case, when changing this operation mode, the control means allows the change of the operation mode on conditions that the radiator target temperature is achievable by the heat radiation in the radiator in the operation mode after shift. Consequently, it is possible to avoid, in advance, the disadvantage that the operation mode returns to the original operation mode due to the shortage of the heating capability by the radiator and afterward the operation mode frequently changes, and it is possible to continue stable and comfortable vehicle interior air conditioning.

For example, in a case where the outdoor air temperature and the outdoor air humidity rise in the heating mode, the control means shifts to the dehumidifying and heating mode. At this time, as in an embodiment disclosed above, the control means shifts to the dehumidifying and heating mode on conditions that the radiator target temperature is achievable by the heat radiation in the radiator in the dehumidifying and heating mode. Consequently, it is possible to appropriately change the operation mode from the heating mode to the dehumidifying and heating mode and to continue the stable and comfortable vehicle interior air conditioning.

In this case, as in an embodiment disclosed above, the control means shifts to the heating mode in a case where the outdoor air temperature lowers in the dehumidifying and heating mode or a case where the radiator target temperature is not achievable by the heat radiation in the radiator in the dehumidifying and heating mode. Consequently, the shift from the dehumidifying and heating mode to the heating mode is rapidly achieved, thereby making it possible to continue the comfortable vehicle interior air conditioning.

Furthermore, for example, in a case where the heat absorption in the heat absorber runs short or a case where the heat radiation in the radiator becomes excessive in the dehumidifying and heating mode, the control means shifts to the dehumidifying and cooling mode. At this time, as in an embodiment disclosed above, the control means shifts to the dehumidifying and cooling mode on conditions that the radiator target temperature is achievable by the heat radiation in the radiator in the dehumidifying and cooling mode. Consequently, it is possible to appropriately change the operation mode from the dehumidifying and heating mode to the dehumidifying and cooling mode, and it is possible to continue the stable and comfortable vehicle interior air conditioning.

In this case, for example, the air-conditioning apparatus for vehicle has an internal cycle mode in which the control means obstructs inflow of the refrigerant into the outdoor heat exchanger and lets the refrigerant absorb heat only in the heat absorber in the dehumidifying and heating mode, and in a case where the heat absorption in the heat absorber runs short or a case where the heat radiation in the radiator becomes excessive in the dehumidifying and heating mode, the control means shifts to the internal cycle mode, and in a case where the heat absorption in the heat absorber further runs short or a case where the heat radiation in the radiator further becomes excessive in this internal cycle mode, the control means shifts to the dehumidifying and cooling mode. At this time, as in an embodiment disclosed above, the control means shifts to the dehumidifying and cooling mode on conditions that the radiator target temperature is achievable by the heat radiation in the radiator in the dehumidifying and cooling mode. Consequently, it is possible to appropriately change the operation mode from the internal cycle mode to the dehumidifying and cooling mode, and it is possible to continue the stable and comfortable vehicle interior air conditioning.

Furthermore, as in an embodiment disclosed above, the control means shifts to the dehumidifying and heating mode in a case where the heat radiation in the radiator runs short in the dehumidifying and cooling mode or a case where the radiator target temperature is not achievable by the heat radiation in the radiator in the dehumidifying and cooling mode. Consequently, the shift from the dehumidifying and cooling mode to the dehumidifying and heating mode is rapidly achieved, thereby making it possible to continue comfortable vehicle interior air conditioning.

Furthermore, as in an embodiment disclosed above, the air-conditioning apparatus for vehicle has an internal cycle mode in which the control means obstructs inflow of the refrigerant into the outdoor heat exchanger and lets the refrigerant absorb heat only in the heat absorber in the dehumidifying and heating mode. At this time, the control means shifts to the internal cycle mode in a case where the heat radiation in the radiator runs short in the dehumidifying and cooling mode or a case where the radiator target temperature is not achievable by the heat radiation in the radiator in the dehumidifying and cooling mode, and the control means shifts to the dehumidifying and heating mode in a case where the heat radiation in the radiator runs short or a case where the heat absorption in the heat absorber becomes excessive, in this internal cycle mode. Consequently, the shift from the dehumidifying and cooling mode to the internal cycle mode is rapidly achieved, thereby making it possible to continue the comfortable vehicle interior air conditioning.

Here, as in an embodiment disclosed above, the air-conditioning apparatus for vehicle has an outdoor expansion valve which decompresses the refrigerant flowing into the outdoor heat exchanger, and the control means controls a capability of the compressor on the basis of a temperature of the heat absorber and controls a valve position of the outdoor expansion valve on the basis of a temperature or a pressure of the radiator, in at least the dehumidifying and cooling mode, and the control means executes a radiator temperature prior mode to increase the capability of the compressor in a case where the heat radiation in the radiator runs short in the dehumidifying and cooling mode. In this case, the control means shifts to the internal cycle mode in a case where the heat radiation in the radiator runs short in this radiator temperature prior mode or a case where the radiator target temperature is not achievable by the heat radiation in the radiator in the dehumidifying and cooling mode. Consequently, such shift from the radiator temperature prior mode to the internal cycle mode is rapidly achieved, thereby making it possible to continue the comfortable vehicle interior air conditioning.

Furthermore, in the above respective inventions, the control means has pieces of maximum radiator temperature data concerning a maximum radiator temperature that is achievable by the heat radiation in the radiator for at least each air volume of the radiator and outdoor air temperature in each of the dehumidifying and heating mode and the dehumidifying and cooling mode, and on the basis of these pieces of the maximum radiator temperature data, the control means judges whether or not the radiator target temperature is achievable by the heat radiation in the radiator in the dehumidifying and heating mode and the dehumidifying and cooling mode. Consequently, it is possible to exactly judge whether or not the heating capability of the radiator can be acquired in the dehumidifying and heating mode or the dehumidifying and cooling mode, and it is possible to achieve smooth change of the operation mode.

MODE FOR CARRYING OUT THE INVENTION

Hereinafter, embodiments of the present invention will be described in detail with reference to the drawings.

Figure 1:
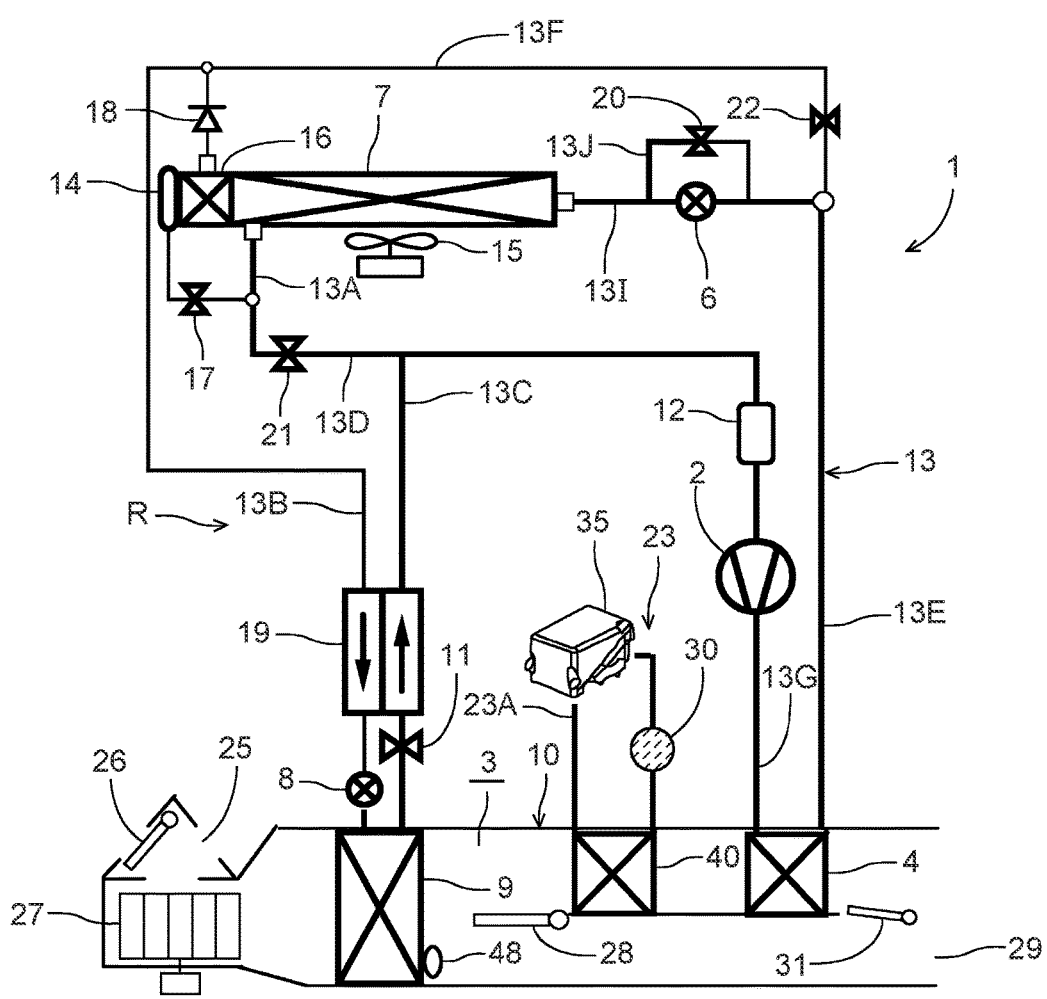
FIG. 1 is a constitutional view of an air-conditioning apparatus for vehicle of one embodiment to which the present invention is applied.

FIG. 1 shows a constitutional view of an air-conditioning apparatus for vehicle 1 of one embodiment of the present invention. The vehicle of the embodiment to which the present invention is applied is an electric car (EV) in which an engine (an internal combustion engine) is not mounted and which runs by driving an electric motor for running with power charged in a battery (which is not shown in the drawing), and the air-conditioning apparatus for vehicle 1 of the present invention is also driven with the power of the battery. That is, the air-conditioning apparatus for vehicle 1 of the embodiment performs a heating mode by a heat pump operation using a refrigerant circuit in the electric car in which it is not possible to perform heating by engine waste heat, and further, the air-conditioning apparatus selectively executes respective operation modes of a dehumidifying and heating mode, an internal cycle mode, a dehumidifying and cooling mode, and a cooling mode.

It is to be noted that the vehicle is not limited to the electric car, and the present invention is also effective for a so-called hybrid car using the engine together with the electric motor for running, and furthermore, needless to say, the present invention is also applicable to a usual car which runs with the engine.

The air-conditioning apparatus for vehicle 1 of the embodiment performs air conditioning (heating, cooling, dehumidifying, and ventilation) of a vehicle interior of the electric car, and there are successively connected, by a refrigerant pipe 13, an electric type of compressor 2 which compresses a refrigerant, a radiator 4 disposed in an air flow passage 3 of an HVAC unit 10 in which vehicle interior air passes and circulates, to let the high-temperature high-pressure refrigerant discharged from the compressor 2 flow inside via a refrigerant pipe 13G and to let this refrigerant radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 and the like, thereby constituting a refrigerant circuit R.

It is to be noted that in the outdoor heat exchanger 7, an outdoor blower 15 is disposed. The outdoor blower 15 is constituted to forcibly blow the outdoor air through the outdoor heat exchanger 7, thereby performing heat exchange between the outdoor air and the refrigerant, and consequently, the outdoor blower blows the outdoor air through the outdoor heat exchanger 7 also during stop (i.e., a velocity is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

Furthermore, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve 21 to be opened during the heating. The refrigerant pipe 13C is connected to the accumulator 12 and the accumulator 12 is connected to a refrigerant suction side of the compressor 2. Furthermore, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve 22 to be opened during the dehumidifying.

Furthermore, the outdoor expansion valve 6 is connected in parallel with a bypass pipe 13J, and in the bypass pipe 13J, a solenoid valve 20 is interposed to open in a cooling mode so that the refrigerant bypasses the outdoor expansion valve 6 to flow. It is to be noted that a pipe between the outdoor expansion valve 6 and the solenoid valve 20 and the outdoor heat exchanger 7 is denoted with 13I.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in FIG. 1, reference numeral 23 indicates a heating medium circulating circuit disposed in the air-conditioning apparatus for vehicle 1 of the embodiment. The heating medium circulating circuit 23 includes a circulating pump 30 constituting circulating means, a heating medium heating electric heater 35, and a heating medium-air heat exchanger 40 (auxiliary heating means) disposed in the air flow passage 3 on an air upstream side of the radiator 4 to the flow of the air of the air flow passage 3, and these components are successively annularly connected to one another by a heating medium pipe 23A. It is to be noted that as the heating medium to circulate in the heating medium circulating circuit 23, for example, water, a refrigerant such as HFO-1234yf, a coolant or the like is employed.

Then, when the circulating pump 30 is operated and the heating medium heating electric heater 35 is energized to generate heat, the heating medium heated by the heating medium heating electric heater 35 circulates through the heating medium-air heat exchanger 40. That is, the heating medium-air heat exchanger 40 of the heating medium circulating circuit 23 becomes a so-called heater core, and complements the heating of the vehicle interior. The employing of the heating medium circulating circuit 23 can improve electric safety of a passenger.

Then, in the air flow passage 3 on the air upstream side of the heating medium-air heat exchanger 40, an air mix damper 28 is disposed to adjust a ratio at which air (indoor air or outdoor air) in the air flow passage 3 passing through the heat absorber 9 after flowing into the air flow passage 3 is to be passed through the radiator 4. Furthermore, in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute change control of blowing of the air from each outlet mentioned above.

Figure 2:
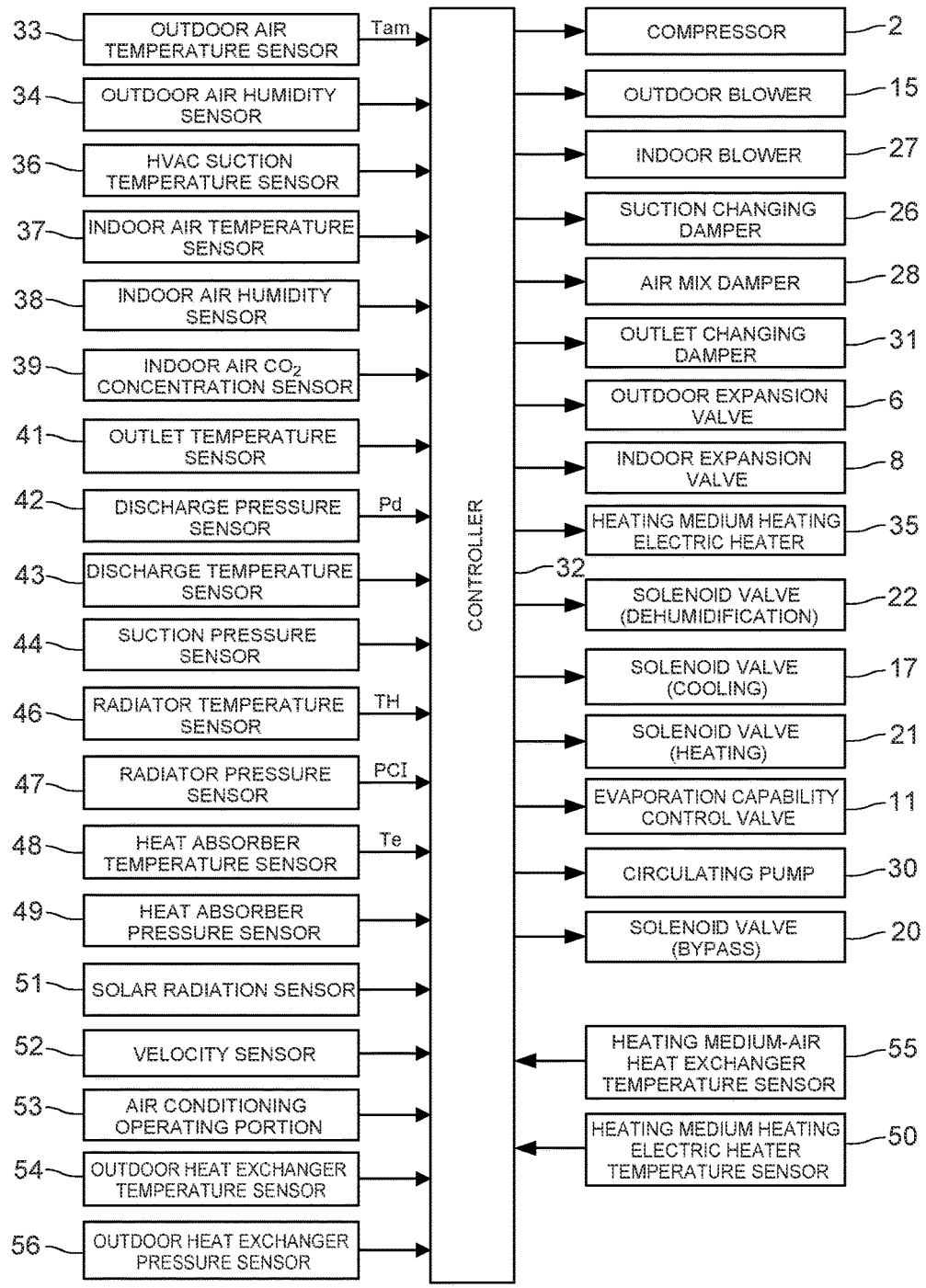
FIG. 2 is a block diagram of an electric circuit of a controller of the air-conditioning apparatus for vehicle of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air passed through the radiator 4 or the temperature of the radiator 4 itself: a radiator temperature TH), a radiator pressure sensor 47 which detects a refrigerant pressure of the radiator 4 (the pressure in the radiator 4 or of the refrigerant which has just flowed out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure in the heat absorber 9 or of the refrigerant which has just flowed out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the change of a predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure in the outdoor heat exchanger 7 or of the refrigerant which has just flowed out from the outdoor heat exchanger 7).

Furthermore, the input of the controller 32 is further connected to respective outputs of a heating medium heating electric heater temperature sensor 50 which detects a temperature of the heating medium heating electric heater 35 of the heating medium circulating circuit 23 (the temperature of the heating medium which has just been heated by the heating medium heating electric heater 35, or the temperature of an unshown electric heater itself disposed in the heating medium heating electric heater 35), and a heating medium-air heat exchanger temperature sensor 55 which detects a temperature of the heating medium-air heat exchanger 40 (the temperature of the air passed through the heating medium-air heat exchanger 40, or the temperature of the heating medium-air heat exchanger 40 itself).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, respective solenoid valves such as the solenoid valve 22 (dehumidifying), the solenoid valve 17 (cooling), the solenoid valve 21 (heating) and the solenoid valve 20 (bypass), the circulating pump 30, the heating medium heating electric heater 35, and the evaporation capability control valve 11. Further, the controller 32 controls these components on the basis of the outputs of the respective sensors and the setting input by the air conditioning operating portion 53.

Next, an operation of the air-conditioning apparatus for vehicle 1 of the embodiment having the above-mentioned constitution will be described. The controller 32 changes and executes respective operation modes such as a heating mode, a dehumidifying and heating mode, an internal cycle mode, a dehumidifying and cooling mode, and a cooling mode. First, a flow of the refrigerant in each operation mode will be described.

(1) Flow of Refrigerant of Heating Mode

When the heating mode is selected by the controller 32 (an auto mode) or a manual operation to the air conditioning operating portion 53 (a manual mode), the controller 32 opens the solenoid valve 21 (for the heating) and closes the solenoid valve 17. Then, the controller closes the solenoid valve 22 and closes the solenoid valve 20.

Further, the controller operates the compressor 2 and the respective blowers 15 and 27, and the air mix damper 28 has a state of passing the air blown out from the indoor blower 27 through the heating medium-air heat exchanger 40 and the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4 (by the heating medium-air heat exchanger 40 and the radiator 4 when the heating medium circulating circuit 23 operates), whereas the refrigerant in the radiator 4 has the heat taken by the air and is cooled to condense and liquefy.

The refrigerant liquefied in the radiator 4 flows out from the radiator 4, and then flows through the refrigerant pipe 13E to reach the outdoor expansion valve 6. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15. That is, the refrigerant circuit R becomes a heat pump. Then, the low-temperature refrigerant flowing out from the outdoor heat exchanger 7 flows through the refrigerant pipe 13A and the solenoid valve 21 and the refrigerant pipe 13D, and flows from the refrigerant pipe 13C into the accumulator 12 to perform gas liquid separation therein, and then the gas refrigerant is sucked into the compressor 2, thereby repeating this circulation. The air heated in the radiator 4 flows through the heating medium-air heat exchanger 40 and is blown out from the outlet 29, thereby performing the heating of the vehicle interior.

The controller 32 calculates a radiator target pressure PCO (a target value of a pressure of the radiator 4) from a radiator target temperature TCO (a target value of a temperature of the radiator 4) calculated from the target outlet temperature TAO which will be described later, controls a number of revolution of the compressor 2 on the basis of the radiator target pressure PCO and a refrigerant pressure of the radiator 4 which is detected by the radiator pressure sensor 47 (the radiator pressure PCI, i.e., a high pressure of the refrigerant circuit R), also controls a valve position of the outdoor expansion valve 6 on the basis of a temperature (the radiator temperature TH) of the radiator 4 which is detected by the radiator temperature sensor 46 and the radiator pressure PCI detected by the radiator pressure sensor 47, and controls a subcool degree of the refrigerant in an outlet of the radiator 4. The radiator target temperature TCO basically has a relation of TCO=TAO, but a predetermined limit of controlling is provided.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior.

The controller 32 controls the number of revolution of the compressor 2 on the basis of the radiator target pressure PCO calculated from the radiator target temperature TCO and the radiator pressure PCI (the high pressure of the refrigerant circuit R) detected by the radiator pressure sensor 47, and also controls the valve position of the outdoor expansion valve 6 on the basis of the temperature (the heat absorber temperature Te) of the heat absorber 9 which is detected by the heat absorber temperature sensor 48.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. That is, in this internal cycle mode, the outdoor expansion valve 6 is shut off by the control of the outdoor expansion valve 6 in the dehumidifying and heating mode, and hence in the present invention, this internal cycle mode is grasped as a part of the dehumidifying and heating mode.

However, when the outdoor expansion valve 6 and the solenoid valve 21 close (the solenoid valve 20 also closes), inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but a heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution of the compressor 2 on the basis of the temperature of the heat absorber 9 or the radiator pressure PCI described above (the high pressure of the refrigerant circuit R). At this time, the controller 32 selects a smaller compressor target number of revolution from compressor target numbers of revolution obtainable by calculations from the temperature of the heat absorber 9 or the radiator pressure PCI, to control the compressor 2.

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Then, the controller operates the compressor 2 and the respective blowers 15 and 27, and the air mix damper 28 has the state of passing the air blown out from the indoor blower 27 through the heating medium-air heat exchanger 40 and the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior.

The controller 32 controls the number of revolution of the compressor 2 on the basis of the temperature (the heat absorber temperature Te) of the heat absorber 9 which is detected by the heat absorber temperature sensor 48, also controls the valve position of the outdoor expansion valve 6 on the basis of the above-mentioned high pressure of the refrigerant circuit R, and controls a refrigerant pressure of the radiator 4 (the radiator pressure PCI).

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including full open (the valve position is an upper limit of controlling)). It is to be noted that the air mix damper 28 has a state where the air does not pass through the heating medium-air heat exchanger 40 and the radiator 4. However, the air may slightly pass.

In consequence, the high-temperature high-pressure gas refrigerant discharged from the compressor 2 flows into the radiator 4. The air in the air flow passage 3 does not pass through the radiator 4, the refrigerant therefore only passes the radiator, and the refrigerant flowing out from the radiator 4 flows through the refrigerant pipe 13E to reach the solenoid valve 20 and the outdoor expansion valve 6. At this time, the solenoid valve 20 is open, and hence the refrigerant bypasses the outdoor expansion valve 6 to pass the bypass pipe 13J, and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 to the vehicle interior, thereby performing cooling of the vehicle interior.

Figure 3:
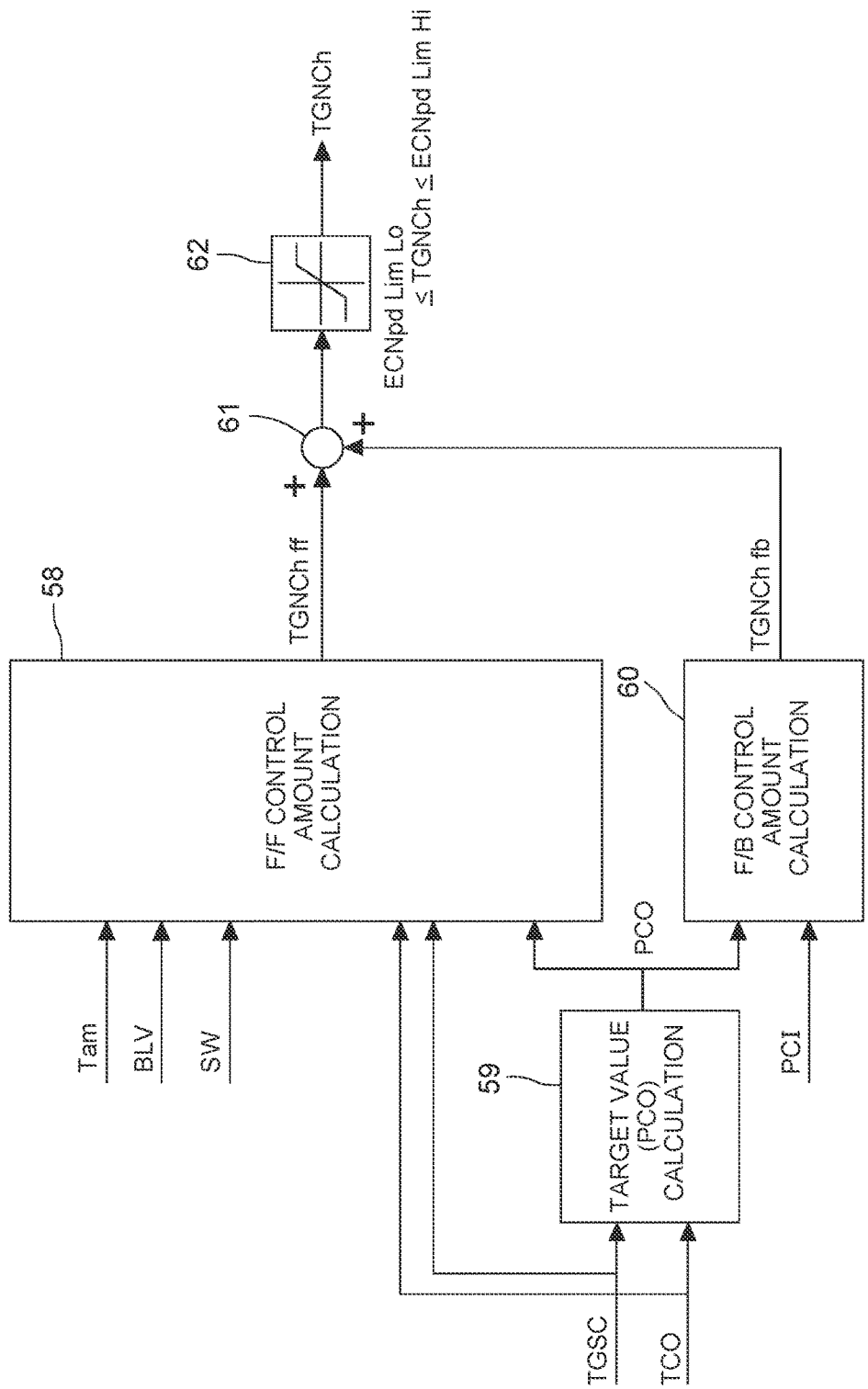
FIG. 3 is a control block diagram concerning compressor control of the controller of FIG. 2.
Figure 4:
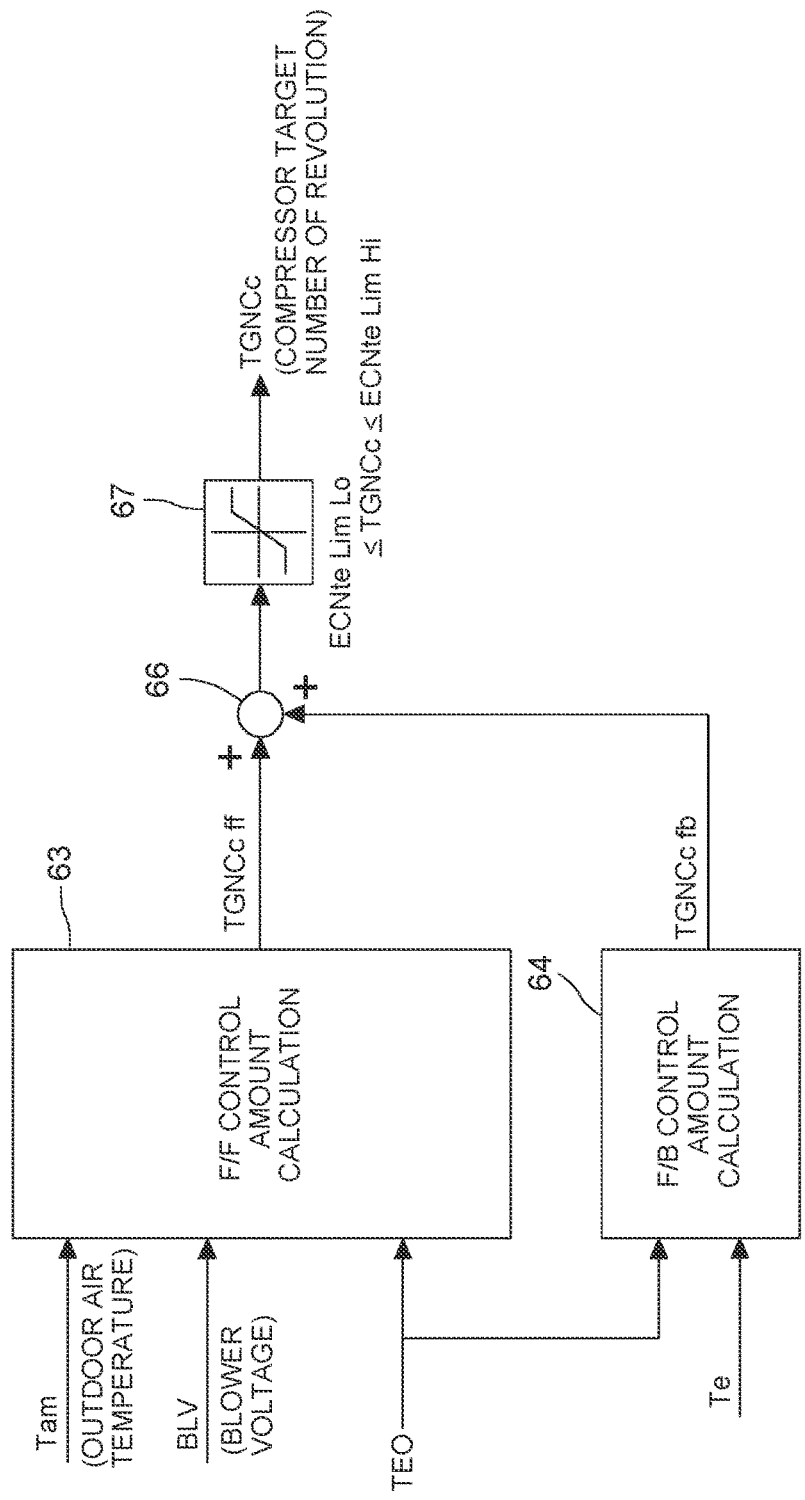
FIG. 4 is another control block diagram concerning the compressor control of the controller of FIG. 2.
Figure 5:
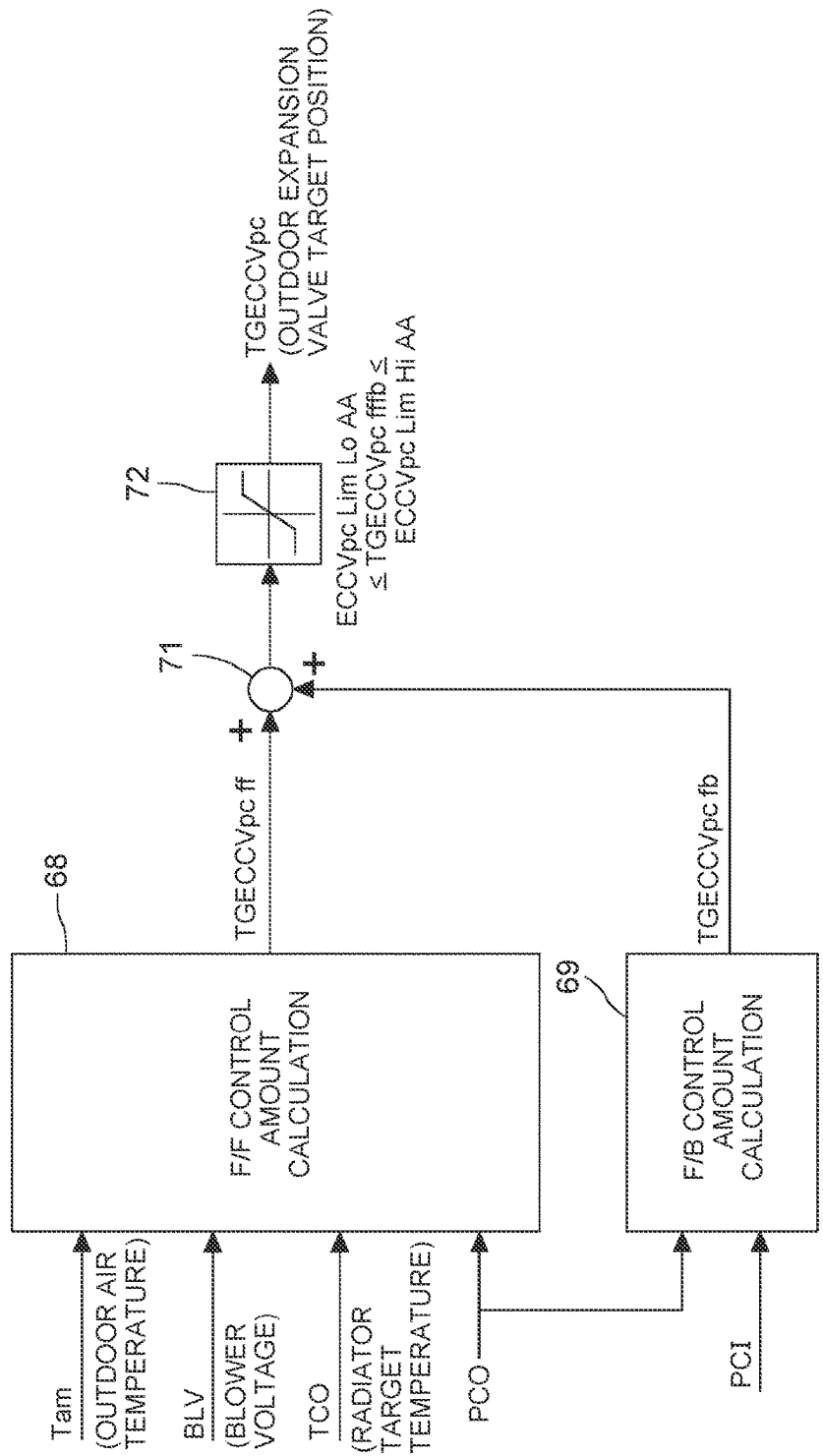
FIG. 5 is a control block diagram concerning outdoor expansion valve control of the controller of FIG. 2.

In this cooling mode, the controller 32 controls the number of revolution of the compressor 2 on the basis of the temperature of the heat absorber 9 which is detected by the heat absorber temperature sensor 48. Next, FIG. 3 to FIG. 5 show control block diagrams of the compressor 2 and the outdoor expansion valve 6 by the controller 32 in each of the above-mentioned operation modes. FIG. 3 is a control block diagram of the controller 32 which determines a target number of revolution (a compressor target number of revolution) TGNCh of the compressor 2 for the heating mode and the dehumidifying and heating mode. An F/F (feedforward) control amount calculation section 58 of the controller 32 calculates an F/F control amount TGNChff of the compressor target number of revolution on the basis of an outdoor air temperature Tam obtainable from the outdoor air temperature sensor 33, a blower voltage BLV of the indoor blower 27, an air mix damper position SW of the air mix damper 28 which is obtainable in accordance with SW=(TAO−Te)/(TH−Te), a target subcool degree TGSC that is a target value of a subcool degree SC in the outlet of the radiator 4, the radiator target temperature TCO that is a target value of the temperature of the radiator 4, and the radiator target pressure PCO that is a target value of the pressure of the radiator 4.

It is to be noted that TAO is the target outlet temperature which is a target value of the temperature of the air from the outlet 29, TH is a temperature (the radiator temperature) of the radiator 4 which is obtainable from the radiator temperature sensor 46, Te is a temperature (the heat absorber temperature) of the heat absorber 9 which is obtainable from the heat absorber temperature sensor 48, and the air mix damper position SW changes in a range of 0≤SW≤1, in which 0 indicates an air mix shut off state where the air does not pass through the radiator 4 and 1 indicates an air mix fully open state to pass all the air in the air flow passage 3 through the radiator 4.

A target value calculation section 59 calculates the radiator target pressure PCO on the basis of the target subcool degree TGSC and the radiator target temperature TCO. Furthermore, an F/B (feedback) control amount calculation section 60 calculates an F/B control amount TGNChfb of the compressor target number of revolution on the basis of the radiator target pressure PCO and the radiator pressure PCI that is a refrigerant pressure of the radiator 4. Then, the F/F control amount TGNChff calculated by the F/F control amount calculation section 58 and the control amount TGNChfb calculated by the FB control amount calculation section 60 are added by an adder 61, a limit setting section 62 attaches limits of an upper limit of controlling and a lower limit of controlling, and then the compressor target number of revolution TGNCh is determined. In the above-mentioned heating mode and dehumidifying and heating mode, the controller 32 controls the number of revolution of the compressor 2 on the basis of the compressor target number of revolution TGNCh.

On the other hand, FIG. 4 is a control block diagram of the controller 32 which determines a target number of revolution (a compressor target number of revolution) TGNCc of the compressor 2 for the above cooling mode and dehumidifying and cooling mode (a normal mode which will be described later). An F/F control amount calculation section 63 of the controller 32 calculates an F/F control amount TGNCcff of the compressor target number of revolution on the basis of the outdoor air temperature Tam, the blower voltage BLV, and a heat absorber target temperature TEO that is the target value of the temperature of the heat absorber 9.

Furthermore, an F/B control amount calculation section 64 calculates an F/B control amount TGNCcfb of the compressor target number of revolution on the basis of the heat absorber target temperature TEO and the heat absorber temperature Te. Then, the F/F control amount TGNCcff calculated by the F/F control amount calculation section 63 and the F/B control amount TGNCcfb calculated by the F/B control amount calculation section 64 are added by an adder 66, and a limit setting section 67 attaches limits of an upper limit of controlling and a lower limit of controlling, and then the compressor target number of revolution TGNCc is determined. In the cooling mode and a normal mode of the dehumidifying and cooling mode, the controller 32 controls the number of revolution of the compressor 2 on the basis of the compressor target number of revolution TGNCc.

It is to be noted that in the internal cycle mode, the controller 32 controls the number of revolution of the compressor 2 by use of a smaller control amount in the compressor target number of revolution TGNCh calculated for the heating mode and the dehumidifying and heating mode and the compressor target number of revolution TGNCc calculated for the cooling mode and the dehumidifying and cooling mode as described above.

Next, FIG. 5 is a control block diagram of the controller 32 which determines a target position (an outdoor expansion valve target position) TGECCVpc of the outdoor expansion valve 6 in the dehumidifying and cooling mode. An F/F control amount calculation section 68 of the controller 32 calculates an F/F control amount TGECCVpcff of the outdoor expansion valve target position on the basis of the outdoor air temperature Tam, the blower voltage BLV, the radiator target temperature TCO, and the radiator target pressure PCO.

Furthermore, an F/B control amount calculation section 69 calculates an F/B control amount TGECCVpcfb of the outdoor expansion valve target position on the basis of the radiator target pressure PCO and the radiator pressure PCI. Then, the F/F control amount TGECCVpcff calculated by the F/F control amount calculation section 68 and the F/B control amount TGECCVpcfb calculated by the F/B control amount calculation section 69 are added by an adder 71, a limit setting section 72 attaches limits of an upper limit of controlling and a lower limit of controlling, and then the outdoor expansion valve target position TGECCVpc is determined. In the dehumidifying and cooling mode, the controller 32 controls the valve position of the outdoor expansion valve 6 on the basis of this outdoor expansion valve target position TGECCVpc.

The air flowing through the air flow passage 3 receives cooling from the heat absorber 9 or a heating operation from the radiator 4 (or the heating medium-air heat exchanger 40) (adjusted in the air mix damper 28) to be blown out from the outlet 29 to the vehicle interior in the above respective operation modes. The controller 32 calculates the target outlet temperature TAO on the basis of the outdoor air temperature Tam detected by the outdoor air temperature sensor 33, the temperature of the vehicle interior which is detected by the indoor air temperature sensor 37, the blower voltage, the solar radiation amount or the like detected by the solar radiation sensor 51, and a target interior temperature (the predetermined temperature) of the vehicle interior which is set by the operating portion 53, and the controller changes each operation mode as described later to control a temperature of the air to be blown out from the outlet 29 into the target outlet temperature TAO as described later.

(6) Change Control of Operation Mode

Next, change control of the above each operation mode by the controller 32 will be described with reference to FIG. 6 to FIG. 9.

(6-1) Selection Control of Operation Mode on Startup

Figure 6:
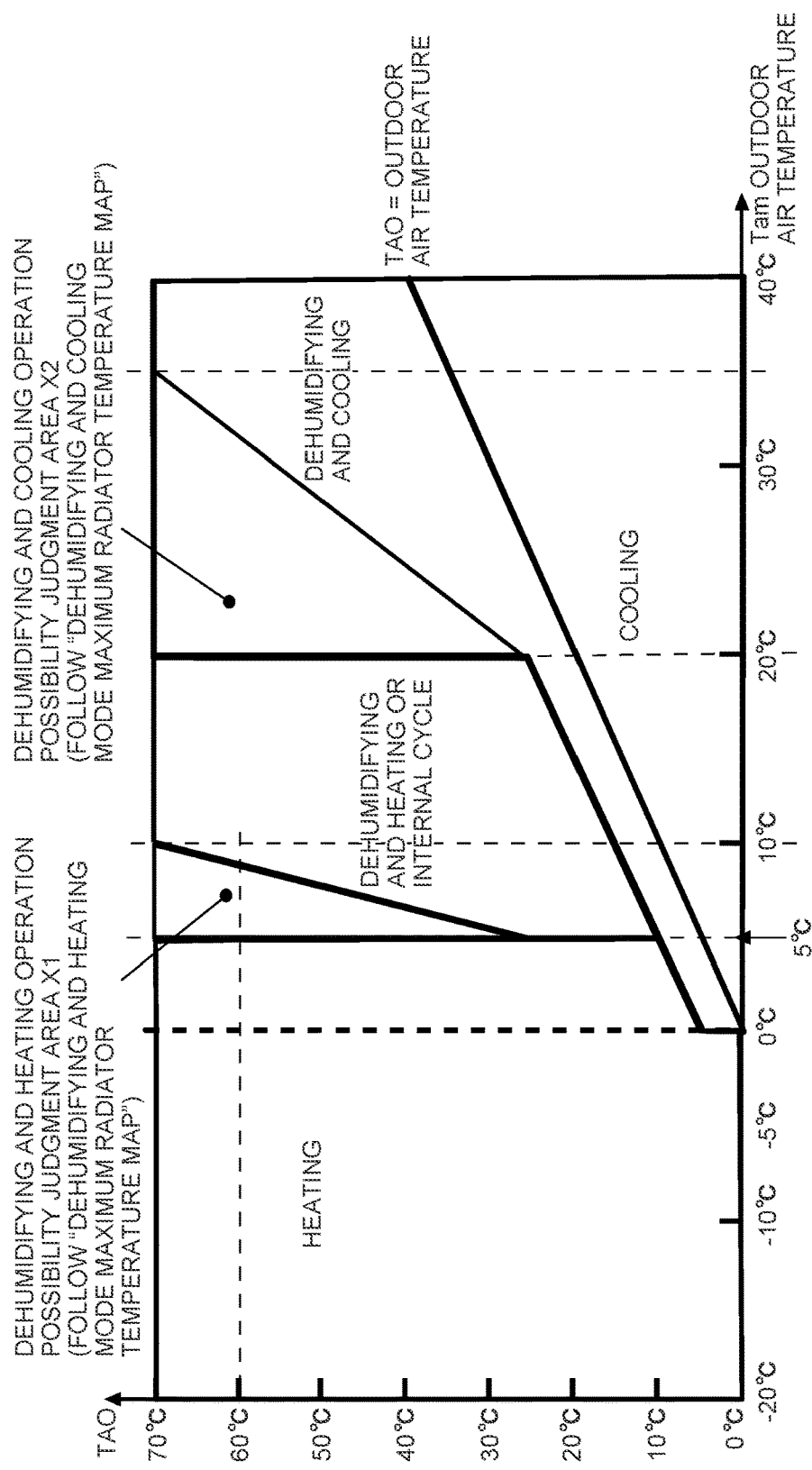
FIG. 6 is a diagram explaining selection control of an operation mode on startup of the controller of FIG. 2.

FIG. 6 shows the operation mode to be selected by the controller 32 of the air-conditioning apparatus for vehicle 1 on startup. On startup, the controller 32 selects the operation mode on the basis of the outdoor air temperature Tam detected by the outdoor air temperature sensor 33 and the target outlet temperature TAO. That is, in FIG. 6, line L1 is a line of the target outlet temperature TAO=the outdoor air temperature Tam.

First, in the case of the embodiment, in a case where the outdoor air temperature Tam is 0° C. or less on startup, the controller 32 selects the heating mode. Furthermore, in a case where the outdoor air temperature Tam is higher than 0° C. and the target outlet temperature TAO is the outdoor air temperature Tam or less, the controller selects the cooling mode. Furthermore, in a case where the outdoor air temperature Tam is higher than 0° C.+α (hysteresis: e.g., 5° C.) and is a predetermined value (e.g., 20° C. or the like) or less and in a case where the target outlet temperature TAO is higher than the outdoor air temperature Tam+β (predetermined hysteresis: e.g., 3 deg.), the controller selects the dehumidifying and heating mode or the internal cycle mode, and further in a case where the outdoor air temperature Tam is higher than the above predetermined value, the controller selects the dehumidifying and cooling mode.

(6-1-1) Dehumidifying and Heating Operation Possibility Judgment Area X1

Additionally, in the present invention, a dehumidifying and heating operation possibility judgment area X1 is disposed in a region of the dehumidifying and heating mode in a boundary with the heating mode. In the case of the embodiment, the dehumidifying and heating operation possibility judgment area X1 is a region surrounded with a line connecting a point of the outdoor air temperature Tam=5° C. and the target outlet temperature TAO=25° C. and a point of the outdoor air temperature Tam=10° C. and the target outlet temperature TAO=70° C., and a line of the outdoor air temperature Tam=5° C. (Tam+α), and in this region, the controller 32 selects one of the dehumidifying and heating mode and the heating mode in accordance with the radiator target temperature TCO on startup and the dehumidifying and heating mode maximum radiator temperature MAP shown in FIG. 8.

Figure 8:
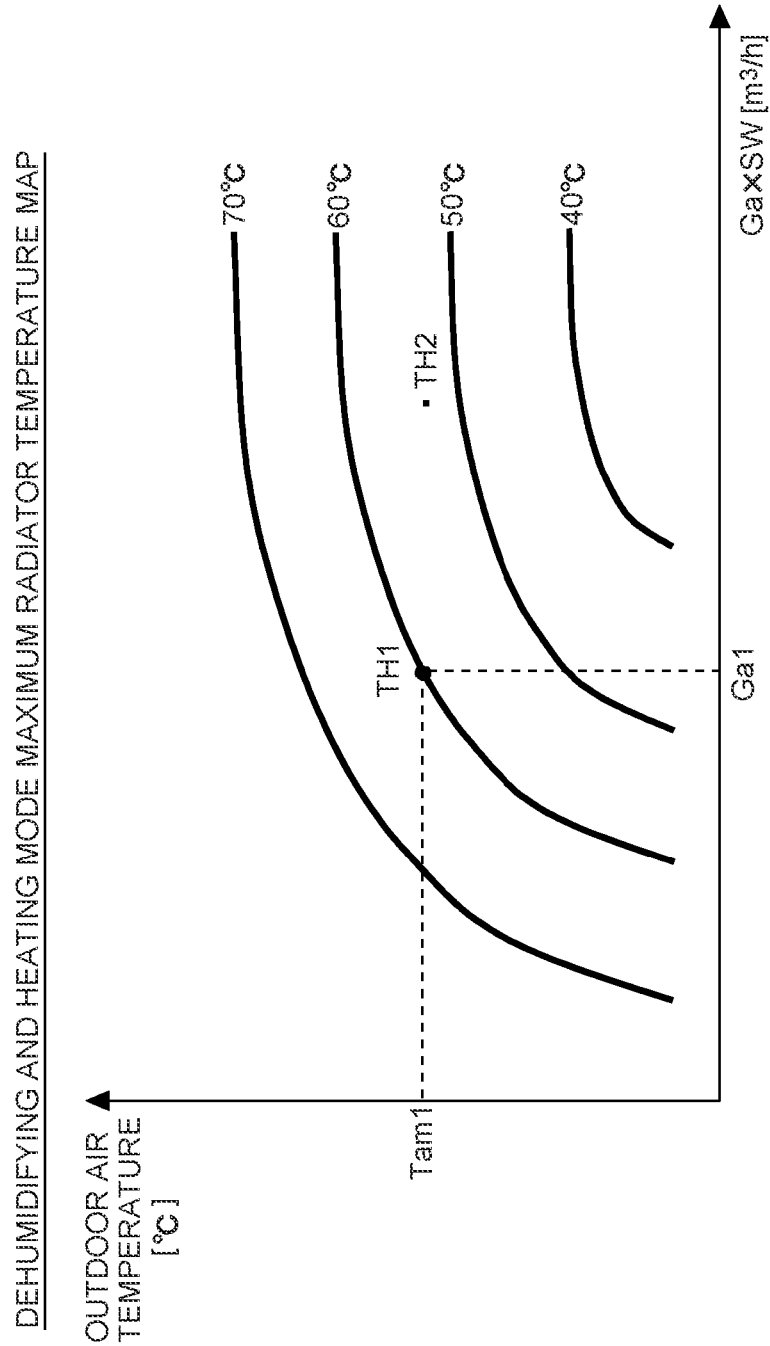
FIG. 8 is a diagram showing a dehumidifying and heating mode maximum radiator temperature MAP held by the controller of FIG. 2.

The dehumidifying and heating mode maximum radiator temperature MAP of FIG. 8 shows maximum radiator temperature data in which a maximum radiator temperature THmax achievable by the heat radiation in the radiator 4 is beforehand obtained by experiments, in a case where the refrigerant circuit R includes the flow of the refrigerant of the dehumidifying and heating mode, and the maximum radiator temperature is beforehand written and held in the controller 32. Ga in abscissa Ga×SW of FIG. 8 is an air volume of the air flowing into the air flow passage 3 and is calculated from a target value of the blower voltage BLV of the indoor blower 27 or a present value of the blower voltage BLV. SW is the position of the air mix damper 28 mentioned above, and is obtainable by SW=(TAO−Te)/(TH−Te). Therefore, Ga×SW means the air volume of the air to be passed through the radiator 4. Furthermore, the ordinate indicates the outdoor air temperature Tam.

Furthermore, a line denoted with 40° C. in the drawing is a line at which the maximum radiator temperature THmax achievable by the heat radiation in the radiator 4 is 40° C., and connects a point measured for each air volume Ga×SW of the radiator 4 and outdoor air temperature Tam. This also applies to lines denoted with 50° C., 60° C. and 70° C., and the lines indicate that maximum radiator temperatures THmax achievable by the heat radiation in the radiator 4 are 50° C., 60° C. and 70° C., respectively.

Now, when the air volume Ga×SW of the radiator 4 is Ga1 and the outdoor air temperature Tam is Tam1, the maximum radiator temperature THmax achievable by the heat radiation in the radiator 4 is extracted as TH1. In the example shown in FIG. 8, TH1 is present on the line of 60° C. and hence THmax is 60° C. In a case where TH1 is present between the line of 50° C. and the line of 60° C. (indicated with TH2 in FIG. 8), the THmax is, for example, about 55° C. between 50° C. and 60° C.

In the above dehumidifying and heating operation possibility judgment area X1, the controller 32 extracts the maximum radiator temperature THmax achievable at this time (on startup in this case) with reference to the dehumidifying and heating mode maximum radiator temperature MAP of FIG. 8, on the basis of the air volume (Ga×SW) of the radiator 4 which is calculated on startup and the outdoor air temperature Tam at this time. Next, the controller judges whether or not the maximum radiator temperature THmax is not less than the radiator target temperature TCO on startup (TCO≤THmax), and the controller judges that the radiator target temperature TCO is achievable by the heat radiation in the radiator 4 in the dehumidifying and heating mode when the maximum radiator temperature THmax is not less than the radiator target temperature TCO, and selects the dehumidifying and heating mode as the operation mode to start up. Conversely, when the maximum radiator temperature THmax is lower than the radiator target temperature TCO, the controller judges that the radiator target temperature TCO is not achievable by the heat radiation in the radiator 4 in the dehumidifying and heating mode, and selects the heating mode as the operation mode to start up.

That is, also when the operation mode to be selected on startup is the dehumidifying and heating mode, the controller 32 starts up in the heating mode in a case where the radiator target temperature TCO is not achievable by the heat radiation in the radiator 4 in the dehumidifying and heating mode in the dehumidifying and heating operation possibility judgment area X1. Consequently, it is possible to start rapid and comfortable vehicle interior air conditioning with the sufficient heating capability by the radiator 4.

(6-1-2) Dehumidifying and Cooling Operation Possibility Judgment Area X2

Furthermore, in the present invention, a dehumidifying and cooling operation possibility judgment area X2 is disposed also in a region of the dehumidifying and cooling mode in a boundary with the dehumidifying and heating mode. In the case of the embodiment, the dehumidifying and cooling operation possibility judgment area X2 is a region surrounded with a line connecting a point of the outdoor air temperature Tam=20° C. and the target outlet temperature TAO=25° C. and a point of the outdoor air temperature Tam=35° C. and the target outlet temperature TAO=70° C., and a line of the outdoor air temperature Tam=20° C., and in this region, the controller 32 selects one of the dehumidifying and cooling mode and the dehumidifying and heating mode in accordance with the radiator target temperature TCO on startup and the dehumidifying and cooling mode maximum radiator temperature MAP shown in FIG. 9.

Figure 9:
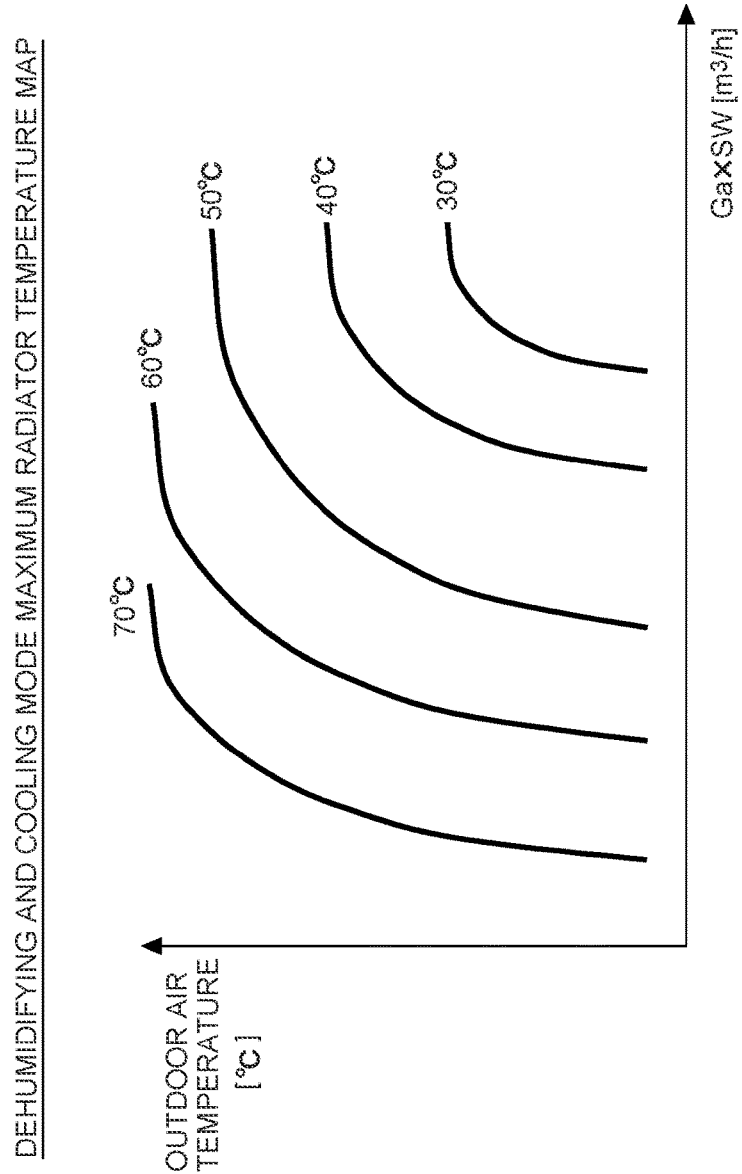
FIG. 9 is a diagram showing a dehumidifying and cooling mode maximum radiator temperature MAP held by the controller of FIG. 2.

The dehumidifying and cooling mode maximum radiator temperature MAP of FIG. 9 shows maximum radiator temperature data in which the maximum radiator temperature THmax achievable by the heat radiation in the radiator 4 is beforehand obtained by experiments, in a case where the refrigerant circuit R includes the flow of the refrigerant of the dehumidifying and cooling mode, and the maximum radiator temperature is beforehand written and held in the controller 32 in the same manner as in dehumidifying and heating mode maximum radiator temperature MAP. The abscissa and ordinate of FIG. 9 are also similar to those of FIG. 8. Furthermore, lines denoted with 30° C., 40° C., 50° C., 60° C. and 70° C. in the drawing are similar to those of FIG. 8, and are lines at which the maximum radiator temperatures THmax achievable by the heat radiation in the radiator 4 are 30° C., 40° C., 50° C., 60° C. and 70° C., respectively.

Also in the above dehumidifying and cooling operation possibility judgment area X2, the controller 32 extracts the maximum radiator temperature THmax on startup with reference to the dehumidifying and cooling mode maximum radiator temperature MAP of FIG. 9, on the basis of the air volume (Ga×SW) of the radiator 4 which is calculated on startup and the outdoor air temperature Tam at this time. An extracting method is the same as in the above-mentioned case of FIG. 8. Next, the controller judges whether or not the maximum radiator temperature THmax is not less than the radiator target temperature TCO on startup (TCO≤THmax), and the controller judges that the radiator target temperature TCO is achievable by the heat radiation in the radiator 4 in the dehumidifying and cooling mode when the maximum radiator temperature THmax is not less than the radiator target temperature TCO, and selects the dehumidifying and cooling mode as the operation mode to start up. Conversely, when the maximum radiator temperature THmax is lower than the radiator target temperature TCO, the controller judges that the radiator target temperature TCO is not achievable by the heat radiation in the radiator 4 in the dehumidifying and cooling mode, and selects the dehumidifying and heating mode as the operation mode to start up.

That is, also when the operation mode to be selected on startup is the dehumidifying and cooling mode, the controller 32 starts up in the dehumidifying and heating mode in a case where the radiator target temperature TCO is not achievable by the heat radiation in the radiator 4 in the dehumidifying and cooling mode in the dehumidifying and cooling operation possibility judgment area X2. Consequently, it is possible to start the rapid and comfortable vehicle interior air conditioning with the sufficient heating capability by the radiator 4.

In consequence, the controller 32 selects the operation mode in which the radiator target temperature TCO is achievable by the heat radiation in the radiator 4, and hence it is possible to perform comfortable vehicle interior air conditioning in the operation mode in which the heating capability in the radiator 4 can be acquired.

Especially, the controller 32 has the dehumidifying and heating mode maximum radiator temperature MAP and the dehumidifying and cooling mode maximum radiator temperature MAP (maximum radiator temperature data) concerning the maximum radiator temperature THmax achievable by the heat radiation in the radiator 4 for each air volume Ga×SW of the radiator 4 and outdoor air temperature Tam in each of the dehumidifying and heating mode and the dehumidifying and cooling mode, and the controller judges whether or not the radiator target temperature TCO is achievable by the heat radiation in the radiator 4 in the dehumidifying and heating mode and the dehumidifying and cooling mode, on the basis of these MAPs (maximum radiator temperature data). Therefore, it is possible to exactly judge whether or not the heating capability of the radiator 4 can be acquired in the dehumidifying and heating mode or the dehumidifying and cooling mode, and it is possible to achieve smooth change of the operation mode.

(6-2) Change Control of Operation Mode

Figure 7:
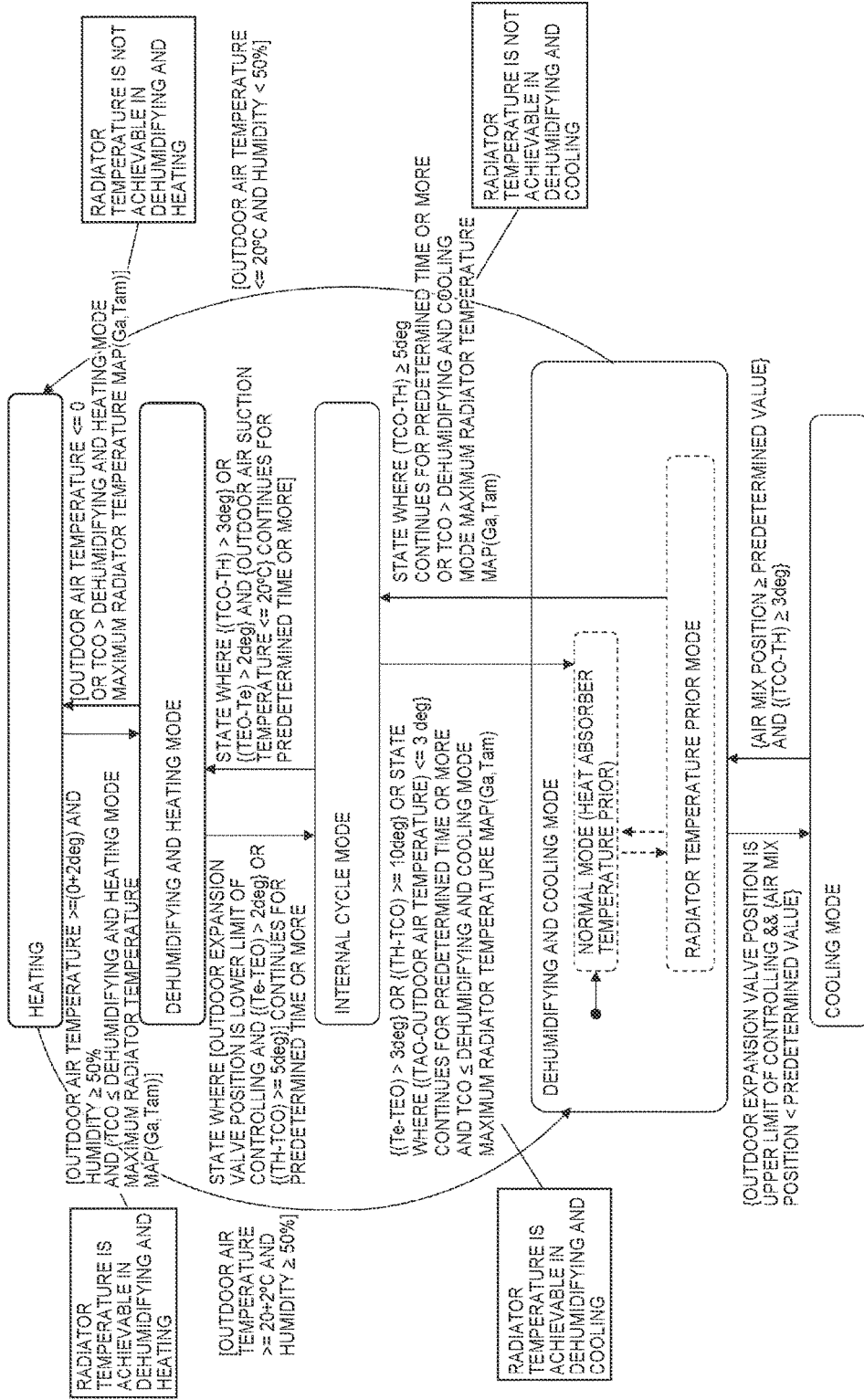
FIG. 7 is a diagram explaining change control of the operation mode by the controller of FIG. 2.

Next, one example of the change control of the operation mode by the controller 32 after the startup will be described with reference to FIG. 7.

(6-2-1) Change Control from Heating Mode to Dehumidifying and Heating Mode

When executing the heating mode, the controller 32 shifts to the dehumidifying and heating mode on conditions that the radiator target temperature TCO is achievable by the heat radiation in the radiator 4 in the refrigerant circuit R of the flow of the dehumidifying and heating mode, in a case where the outdoor air temperature Tam rises to 2° C. or more which is, for example, 2 deg. higher than 0° C. and the outdoor air humidity rises to, for example, 50% or more, on the basis of the outdoor air temperature sensor 33 and the outdoor air humidity sensor 34.

The judgment of whether or not the radiator target temperature TCO is achievable by the heat radiation of the radiator 4 in this case is also performed with reference to the dehumidifying and heating mode maximum radiator temperature MAP of FIG. 8 in the same manner as in the dehumidifying and heating operation possibility judgment area X1 mentioned above. That is, the controller extracts the maximum radiator temperature THmax achievable at this point of time with reference to the dehumidifying and heating mode maximum radiator temperature MAP of FIG. 8, on the basis of the air volume (Ga×SW) of the radiator 4 which is calculated at a point of time when the outdoor air temperature Tam rises to 2° C. or more and the outdoor air humidity rises to 50% or more (the point of time when a requirement to change the operation mode is issued) and the outdoor air temperature Tam at this time.

Next, the controller judges whether or not the maximum radiator temperature THmax is not less than the radiator target temperature TCO at the point of time (TCO THmax), judges that the radiator target temperature TCO is achievable by the heat radiation in the radiator 4 in the dehumidifying and heating mode when the maximum radiator temperature THmax is not less than the radiator target temperature TCO, and shifts to the dehumidifying and heating mode. Conversely, when the maximum radiator temperature THmax is lower than the radiator target temperature TCO, the controller judges that the radiator target temperature TCO is not achievable by the heat radiation in the radiator 4 in the dehumidifying and heating mode, and continues the heating mode as the operation mode.

That is, when changing the operation mode from the heating mode to the dehumidifying and heating mode, the controller 32 allows the change to the dehumidifying and heating mode on conditions that the radiator target temperature TCO is achievable by the heat radiation in the radiator 4 in the dehumidifying and heating mode. Consequently, it is possible to avoid, in advance, the disadvantage that immediately after shifting from the heating mode to the dehumidifying and heating mode, the operation mode returns to the original heating mode due to the shortage of the heating capability by the radiator 4 and afterward the operation mode frequently changes, thereby appropriately changing the operation mode from the heating mode to the dehumidifying and heating mode, so that it is possible to continue the stable and comfortable vehicle interior air conditioning.

(6-2-2) Change Control from Heating Mode to Dehumidifying and Cooling Mode

Furthermore, when executing the heating mode, the controller 32 skips the dehumidifying and heating mode to shift to the dehumidifying and cooling mode, in a case where the outdoor air temperature Tam rises from the above 0° C. to, for example, 22° C. or more which is as much as 2 deg. higher than 20° C. and the outdoor air humidity similarly rises to 50% or more.

(6-2-3) Change Control from Dehumidifying and Heating Mode to Heating Mode

Furthermore, when executing the dehumidifying and heating mode, the controller 32 shifts to the heating mode, in a case where the outdoor air temperature Tam lowers to 0° C. or less or a case where the radiator target temperature TCO is not achievable by the heat radiation in the radiator 4 in the refrigerant circuit R of the flow of the dehumidifying and heating mode. The controller also judges whether or not the radiator target temperature TCO is achievable by the heat radiation of the radiator 4 in this case, with reference to the dehumidifying and heating mode maximum radiator temperature MAP of FIG. 8.

That is, the controller extracts the maximum radiator temperature THmax achievable at the point of time with reference to the dehumidifying and heating mode maximum radiator temperature MAP of FIG. 8, on the basis of the air volume (Ga×SW) of the radiator 4 and the outdoor air temperature Tam. Next, the controller judges whether or not the maximum radiator temperature THmax is lower than the radiator target temperature TCO at the point of time (TCO>THmax), judges that the radiator target temperature TCO is not achievable by the heat radiation in the radiator 4 in the dehumidifying and heating mode when the maximum radiator temperature THmax is lower than the radiator target temperature TCO, and shifts to the heating mode. Consequently, the shift from the dehumidifying and heating mode to the heating mode is rapidly achieved, thereby making it possible to continue the comfortable vehicle interior air conditioning.

Conversely, the controller judges that the radiator target temperature TCO is achievable by the heat radiation in the radiator 4 in the dehumidifying and heating mode when the maximum radiator temperature THmax is not less than the radiator target temperature TCO, and continues the dehumidifying and heating mode as the operation mode as long as the outdoor air temperature Tam does not lower to 0° C. or less.

(6-2-4) Change Control from Dehumidifying and Heating Mode to Internal Cycle Mode Furthermore, when executing the dehumidifying and heating mode, the controller 32 shifts to the internal cycle mode, in a case where there continues, for predetermined time or more, a state where the valve position of the outdoor expansion valve 6 is the above-mentioned lower limit of controlling (i.e., a state where the refrigerant is not throttled any more) and a value of the heat absorber temperature Te−the heat absorber target temperature TEO is larger than, for example, 2 deg. (i.e., a state where the heat absorption in the heat absorber 9 runs short) or a state where a value of the radiator temperature TH−the radiator target temperature TCO is, for example, 5 deg. or more (i.e., a state where the heat radiation in the radiator 4 is excessive).

(6-2-5) Change Control from Internal Cycle Mode to Dehumidifying and Cooling Mode (Normal Mode)

Furthermore, when executing the internal cycle mode, the controller 32 shifts to a normal mode (a heat absorber temperature prior mode) of the dehumidifying and cooling mode on conditions that the radiator target temperature TCO is achievable by the heat radiation in the radiator 4 in the refrigerant circuit R of the flow of the dehumidifying and cooling mode, in a case where there continues, for predetermined time or more, a state where the value of the heat absorber temperature Te−the heat absorber target temperature TEO is larger than, for example, 3 deg. which is larger than 2 deg. as described above (i.e., a state where the heat absorption in the heat absorber 9 further runs short) or a state where the value of the radiator temperature TH−the radiator target temperature TCO is, for example, 10 deg. or more which is larger than 5 deg. as described above (i.e., a state where the heat radiation in the radiator 4 is further excessive) or a state where the value of the target outlet temperature TAO−the outdoor air temperature Tam is, for example, 3 deg. or less.

The judgment of whether or not the radiator target temperature TCO is achievable by the heat radiation in the radiator 4 in this case is also performed with reference to the dehumidifying and cooling mode maximum radiator temperature MAP of FIG. 9 in the same manner as in the above-mentioned dehumidifying and cooling operation possibility judgment area X2. That is, the controller extracts the maximum radiator temperature THmax achievable at the point of time with reference to the dehumidifying and cooling mode maximum radiator temperature MAP of FIG. 9, on the basis of the air volume (Ga×SW) of the radiator 4 which is calculated at a point of time (a point of time when a requirement to change the operation mode is issued) when there continues, for the predetermined time or more, a state where the value of the heat absorber temperature Te−the heat absorber target temperature TEO is larger than 3 deg. or a state where the value of the radiator temperature TH−the radiator target temperature TCO is 10 deg. or more or a state where the value of the target outlet temperature TAO−the outdoor air temperature Tam is 3 deg. or less, and the outdoor air temperature Tam at this time.

Next, the controller judges whether or not the maximum radiator temperature THmax is not less than the radiator target temperature TCO at the point of time (TCO≤THmax), judges that the radiator target temperature TCO is achievable by the heat radiation in the radiator 4 in the dehumidifying and cooling mode when the maximum radiator temperature THmax is not less than the radiator target temperature TCO, and shifts to the normal mode of the dehumidifying and cooling mode. Conversely, the controller judges that the radiator target temperature TCO is not achievable by the heat radiation in the radiator 4 in the dehumidifying and cooling mode when the maximum radiator temperature THmax is lower than the radiator target temperature TCO, and continues the internal cycle mode as the operation mode.

That is, when changing the operation mode from the internal cycle mode in the dehumidifying and heating mode to the dehumidifying and cooling mode, the controller 32 allows the change to the dehumidifying and cooling mode on the conditions that the radiator target temperature TCO is achievable by the heat radiation in the radiator 4 in the dehumidifying and cooling mode. Consequently, it is possible to avoid, in advance, the disadvantage that immediately after shifting from the internal cycle mode to the dehumidifying and cooling mode, the operation mode returns to the original internal cycle mode due to the shortage of the heating capability by the radiator 4 and afterward the operation mode frequently changes, thereby appropriately changing the operation mode from the internal cycle mode in the dehumidifying and heating mode to the dehumidifying and cooling mode, so that it is possible to continue the stable and comfortable vehicle interior air conditioning.

(6-2-6) Change Control from Dehumidifying and Cooling Mode (Radiator Temperature Prior Mode) to Internal Cycle Mode Furthermore, the controller 32 changes and executes the normal mode and the radiator temperature prior mode in this dehumidifying and cooling mode. These normal mode and radiator temperature prior mode will be described later. Then, when executing the radiator temperature prior mode in this dehumidifying and cooling mode, the controller 32 shifts to the internal cycle mode, in a case where the value of the radiator target temperature TCO−the radiator temperature TH is, for example, 5 deg. or more (i.e., the heat radiation in the radiator 4 runs short) and this state continues for the predetermined time or more, or a case where the radiator target temperature TCO is not achievable by the heat radiation in the radiator 4 in the refrigerant circuit R of the flow of the dehumidifying and cooling mode (the radiator temperature prior mode). The judgment of whether or not the radiator target temperature TCO is achievable by the heat radiation in the radiator 4 in this case is also performed with reference to the dehumidifying and cooling mode maximum radiator temperature MAP of FIG. 9.

That is, the controller extracts the maximum radiator temperature THmax achievable at the point of time with reference to the dehumidifying and cooling mode maximum radiator temperature MAP of FIG. 9 on the basis of the air volume (Ga×SW) of the radiator 4 and the outdoor air temperature Tam. Next, the controller judges whether or not the maximum radiator temperature THmax is lower than the radiator target temperature TCO at the point of time (TCO>THmax), judges that the radiator target temperature TCO is not achievable by the heat radiation in the radiator 4 in the dehumidifying and cooling mode (the radiator temperature prior mode) when the maximum radiator temperature THmax is lower than the radiator target temperature TCO, and shifts to the internal cycle mode. Consequently, the shift from the dehumidifying and cooling mode to the internal cycle mode (included in the dehumidifying and heating mode) is rapidly achieved, thereby making it possible to continue the comfortable vehicle interior air conditioning.

Conversely, the controller judges that the radiator target temperature TCO is achievable by the heat radiation in the radiator 4 in the dehumidifying and cooling mode when the maximum radiator temperature THmax is not less than the radiator target temperature TCO, and continues the dehumidifying and cooling mode (the radiator temperature prior mode) as the operation mode, as long as there does not continue, for the predetermined time or more, a state where the value of the radiator target temperature TCO−the radiator temperature TH is 5 deg. or more.

(6-2-7) Change Control from Internal Cycle Mode to Dehumidifying and Heating Mode Furthermore, when executing the internal cycle mode, the controller 32 shifts to the dehumidifying and heating mode, in a case where there continues, for the predetermined time or more, a state where the value of the radiator target temperature TCO−the radiator temperature TH is larger than, for example, 3 deg. (i.e., the heat radiation in the radiator 4 runs short) or the value of the heat absorber target temperature TEO−the heat absorber temperature Te is larger than, for example, 2 deg. (i.e., the heat absorption in the heat absorber 9 is excessive) and an HVAC suction temperature (an outdoor air suction temperature) is, for example, 20° C. or less in a state of introducing the outdoor air.

(6-2-8) Change Control from Dehumidifying and Cooling Mode to Cooling Mode

Furthermore, when executing the dehumidifying and cooling mode, the controller 32 shifts to the cooling mode in a case where the valve position of the outdoor expansion valve 6 is the above-mentioned upper limit of controlling (i.e., a state where the refrigerant is passed as it is) and the air mix damper position SW of the air mix damper 28 is smaller than a predetermined value.

Then, when executing this cooling mode, the controller 32 shifts to the dehumidifying and cooling mode, in a case where the air mix damper position SW is the predetermined value or more and the value of the radiator target temperature TCO–TH is, for example, 3 deg. or more (i.e., the heat radiation in the radiator 4 runs short).

When the controller 32 changes the operation mode in this manner, it is possible to exactly change the operation mode among the dehumidifying and heating mode, the internal cycle mode and the dehumidifying and cooling mode in accordance with a situation where the heat radiation in the radiator 4 or the heat absorption in the heat absorber 9 runs short or becomes excessive depending on an environment of the vehicle or a condition such as the predetermined temperature. Furthermore, it is possible to exactly change the operation mode among the heating mode, the dehumidifying and heating mode and the dehumidifying and cooling mode in accordance with an outdoor air environment, and it is possible to exactly change the operation mode between the cooling mode and the dehumidifying and cooling mode in accordance with a control situation of the outdoor expansion valve 6 or a situation of the heat radiation of the radiator 4.

Especially, when changing the operation mode from the heating mode to the dehumidifying and heating mode and changing the operation mode from the internal cycle mode to the dehumidifying and cooling mode, the controller allows the change of the operation mode on conditions that the radiator target temperature TCO is achievable by the heat radiation in the radiator 4 in the dehumidifying and heating mode or the dehumidifying and cooling mode after the shift. Therefore, it is possible to avoid, in advance, the disadvantage that the operation mode returns to the original mode due to the shortage of the heating capability by the radiator 4 and afterward the operation mode frequently changes, and it is possible to continue the stable and comfortable vehicle interior air conditioning.

Figure 10:
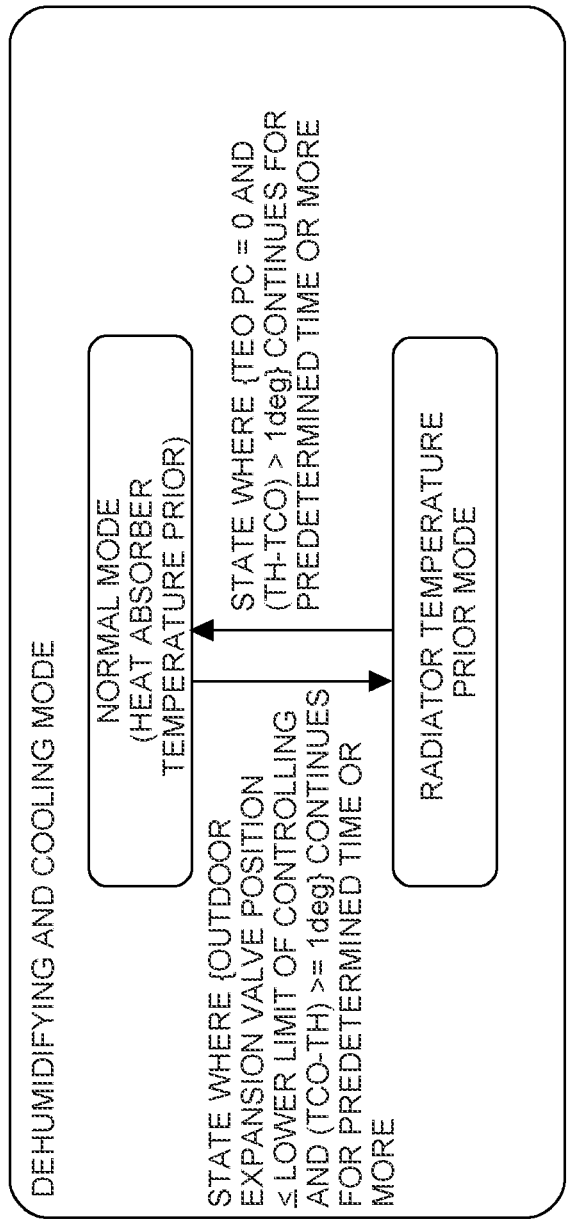
FIG. 10 is a diagram explaining change control of a normal mode and a radiator temperature prior mode in the dehumidifying and cooling mode by the controller of FIG. 2.

(7) Normal Mode and Radiator Temperature Prior Mode in Dehumidifying and Cooling Mode Next, change control of the normal mode (the heat absorber temperature prior mode) and the radiator temperature prior mode in the above-mentioned dehumidifying and cooling mode will be described with reference to FIG. 10 to FIG. 12. As described above, in the normal mode of the dehumidifying and cooling mode, the controller controls the number of revolution of the compressor 2 (the target number of revolution TGNCc) in accordance with the temperature (the heat absorber temperature Te) of the heat absorber 9. Therefore, even in a state where the heat absorber temperature Te converges to the heat absorber target temperature TEO and the valve position of the outdoor expansion valve 6 reaches the above-mentioned lower limit of controlling (a completely throttled state), the high pressure of the refrigerant circuit R does not increase, and the radiator pressure PCI does not reach the radiator target pressure PCO. In this case, the temperature of the radiator 4 (the radiator target temperature TCO) falls in an insufficient state.

Thus, in such a case, the controller 32 executes the radiator temperature prior mode in which the controller lowers the heat absorber target temperature TEO to increase the number of revolution of the compressor 2, increases the capability of the compressor 2 to raise the high pressure, and increases the radiator pressure PCI to the radiator target pressure PCO. FIG. 10 shows mode change control between the normal mode and the radiator temperature prior mode in the dehumidifying and cooling mode. When executing the dehumidifying and cooling mode (the normal mode to prioritize the heat absorber temperature), the controller 32 shifts to the radiator temperature prior mode, in a case where there continues, for the predetermined time or more, a state where the valve position of the outdoor expansion valve 6 is the above lower limit of controlling or less and the value of the radiator target temperature TCO–the radiator temperature TH is, for example, 1 deg. or more (i.e., the heat radiation in the radiator 4 runs short).

Figure 11:
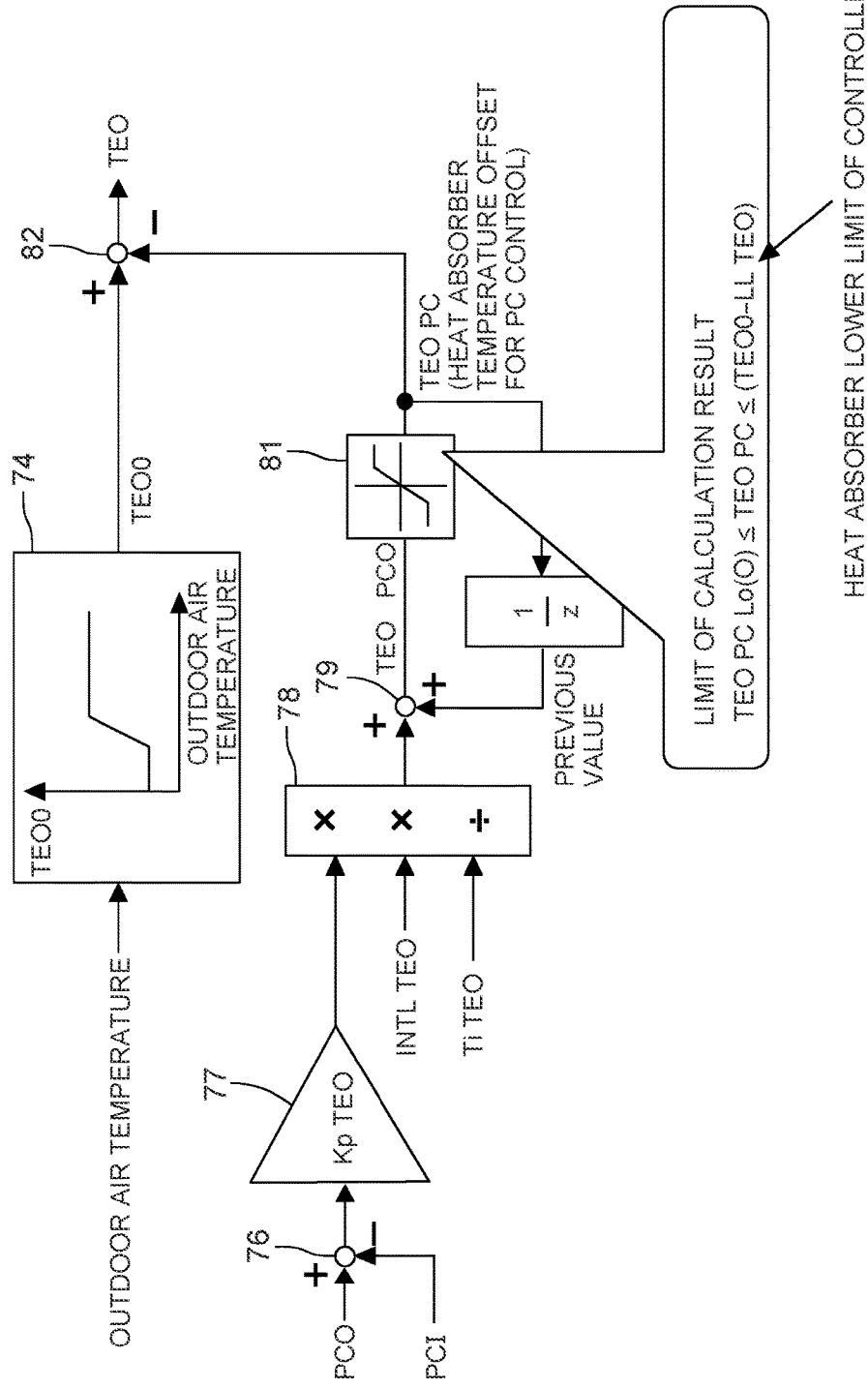
FIG. 11 is a control block diagram of the controller in the radiator temperature prior mode of FIG. 10.
Figure 12:
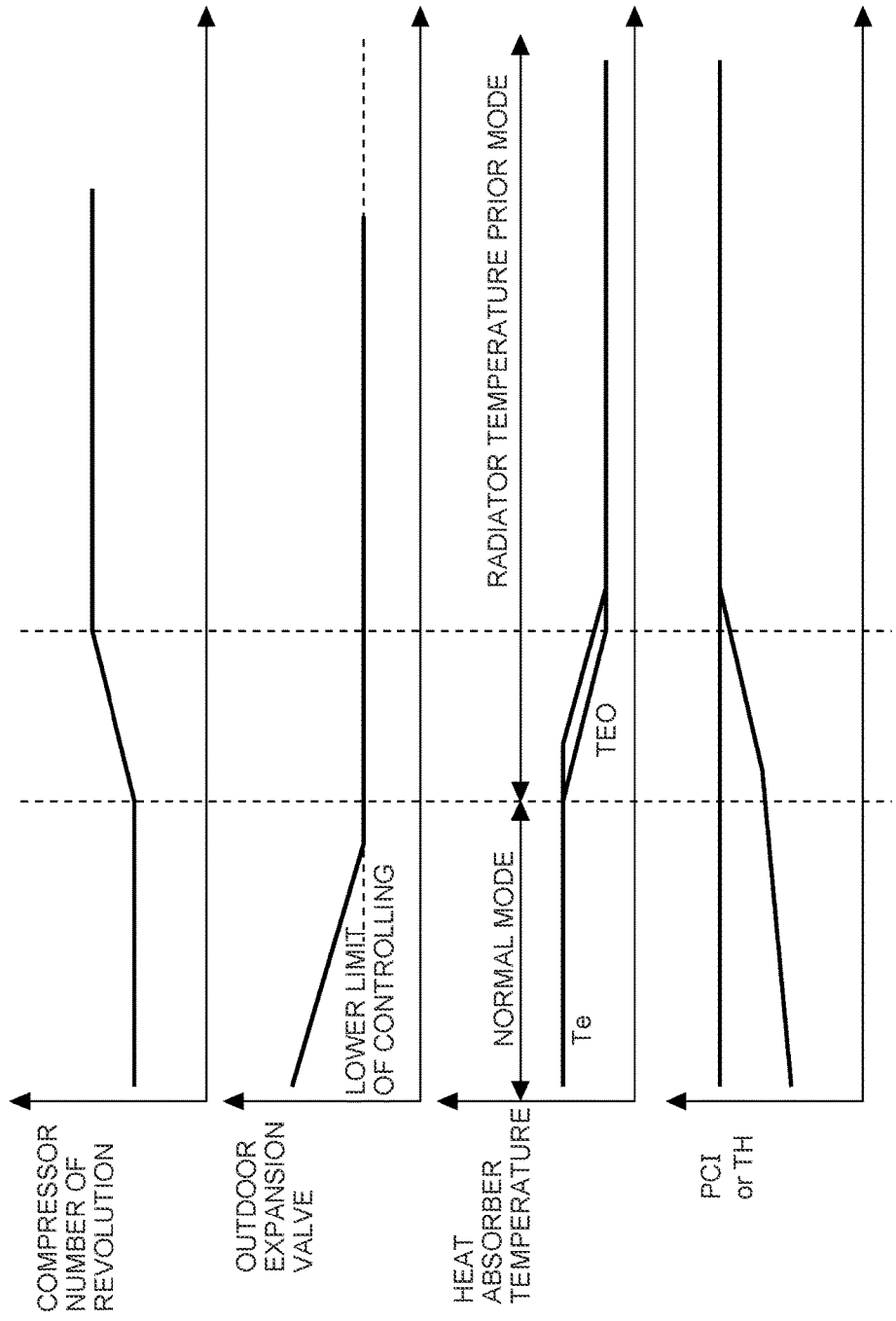
FIG. 12 is a timing chart showing the change control of the normal mode and the radiator temperature prior mode in the dehumidifying and cooling mode of FIG. 10.

FIG. 11 shows one example of a control block diagram of the controller 32 in this radiator temperature prior mode. That is, reference numeral 74 of FIG. 11 is a data table of a basic heat absorber target temperature TEOO, and this table is preset in accordance with the outdoor air temperature. It is to be noted that this basic heat absorber target temperature TEOO is a heat absorber temperature to obtain a humidity required in the environment of the outdoor air temperature. The heat absorber target temperature TEO is usually determined on the basis of the data table 74, but in this radiator temperature prior mode, the controller 32 adds correction on the basis of an integrated value of a difference between the radiator target pressure PCO and the radiator pressure PCI.

That is, the radiator target pressure PCO and the radiator pressure PCI obtainable from the radiator pressure sensor 47 are input into a subtracter 76, and an error e is amplified by an amplifier 77 and input into a calculator 78. The calculator 78 performs integrating calculation of a heat absorber temperature offset in a predetermined integration period and integration time, and an adder 79 adds the previous value to calculate an integrated value TEOPCO of the heat absorber temperature offset. Then, a limit setting section 81 adds limits of an upper limit of controlling and a lower limit of controlling, and then a heat absorber temperature offset TEOPC is determined.

A subtracter 82 subtracts the heat absorber temperature offset TEOPC from the basic heat absorber target temperature TEOO, and the heat absorber target temperature TEO is determined. Therefore, as compared with the normal mode, the heat absorber target temperature TEO lowers as much as the heat absorber temperature offset TEOPC, thereby increasing the compressor target number of revolution TGNCc of the compressor 2, the number of revolution of the compressor 2 increases, and the capability of the compressor 2 increases to raise the high pressure, the radiator pressure PCI rises, and the required temperature TH of the radiator 4 is obtainable.

It is to be noted that the limit setting section 81 limits the heat absorber temperature offset TEOPC in a range where the heat absorber 9 is not frosted. FIG. 12 is a timing chart explaining this behavior. It is seen that when the mode shifts to the radiator temperature prior mode on the above-mentioned conditions from a situation where the outdoor expansion valve 6 is the lower limit of controlling in a state where in the normal mode, the heat absorber temperature Te converges to the heat absorber target temperature TEO and the number of revolution of the compressor 2 is low, the number of revolution of the compressor 2 increases, the heat absorber temperature Te lowers, and the radiator pressure PCI (or the radiator temperature TH) rises.

On the other hand, in this radiator temperature prior mode, the controller 32 returns from the radiator temperature prior mode to the normal mode, in a case where there continues, for the predetermined time or more, a state where the above-mentioned heat absorber temperature offset TEOPC becomes zero and the value of the radiator temperature TH–the radiator target temperature TCO is higher than, for example, 1 deg. (i.e., the heat radiation in the radiator 4 is excessive).

In the case where the temperature TH of the radiator 4 is insufficient even when the temperature Te of the heat absorber 9 converges to the target value TEO and the valve position of the outdoor expansion valve 6 reaches the lower limit of controlling in the dehumidifying and cooling mode or the internal cycle mode in this manner, the controller increases the capability of the compressor 2 to raise the high pressure, and increases a heat radiation value of the refrigerant in the radiator 4, thereby acquiring re-heating by the radiator 4 in the dehumidifying and cooling mode, so that it is possible to acquire an air conditioning performance and it is possible to enlarge an effective range of the dehumidifying and cooling mode, thereby achieving the comfortable vehicle interior air conditioning. In this case, the controller 32 corrects and lowers the heat absorber target temperature TEO in the range where the heat absorber 9 is not frosted, and hence it is possible to prevent generation of frosting due to excessive temperature drop of the heat absorber 9, and energy saving can be achieved.

Furthermore, in the above radiator temperature prior mode, the controller shifts to the internal cycle mode as described above, in a case where the value of the radiator target temperature TCO–the radiator temperature TH is 5 deg. or more and this state continues for the predetermined time or more, or a case where the radiator target temperature TCO is not achievable by the heat radiation in the radiator 4 in the refrigerant circuit R of the flow of the dehumidifying and cooling mode (refer to the dehumidifying and cooling mode maximum radiator temperature MAP of FIG. 9).

It is to be noted that in the dehumidifying and heating mode maximum radiator temperature MAP and the dehumidifying and cooling mode maximum radiator temperature MAP of FIG. 8 and FIG. 9 mentioned above, there has been described the example where the maximum radiator temperature data concerning the maximum radiator temperature THmax is measured for each air volume Ga×SW of the radiator 4 and outdoor air temperature Tam, but alternatively, there may be prepared a dehumidifying and heating mode maximum radiator temperature MAP and a dehumidifying and cooling mode maximum radiator temperature MAP by taking, into consideration, another parameter correlated with the radiator temperature TH, for example, the temperature of the air flowing into the radiator 4, the temperature of the air of the vehicle interior, a velocity or the like to measure the maximum radiator temperature THmax achievable by the heat radiation in the radiator 4 in the dehumidifying and heating mode and the dehumidifying and cooling mode.

Furthermore, the constitution of the refrigerant circuit R which has been described above in each embodiment is not limited to the embodiment, and needless to say, the constitution is changeable without departing from the gist of the present invention.

DESCRIPTION OF REFERENCE NUMERALS 1 air-conditioning apparatus for vehicle
2 compressor
3 air flow passage
4 radiator
6 outdoor expansion valve
7 outdoor heat exchanger
8 indoor expansion valve
9 heat absorber
26 suction changing damper
27 indoor blower (blower fan)
28 air mix damper
31 outlet changing damper
32 controller (control means)
R refrigerant circuit

The invention claimed is:

1. An air-conditioning apparatus for vehicle comprising:
a compressor which compresses a refrigerant;
an air flow passage through which air to be supplied to a vehicle interior flows;
a radiator which lets the refrigerant radiate heat to heat the air to be supplied from the air flow passage to the vehicle interior;
a heat absorber which lets the refrigerant absorb heat to cool the air to be supplied from the air flow passage to the vehicle interior;
an outdoor heat exchanger disposed outside the vehicle interior to let the refrigerant radiate or absorb heat; and
control means,
the air-conditioning apparatus for vehicle having at least respective operation modes of:
a heating mode in which the control means lets the refrigerant discharged from the compressor radiate heat in the radiator, decompresses the refrigerant by which heat has been radiated, and then lets the refrigerant absorb heat in the outdoor heat exchanger,
a dehumidifying and heating mode in which the control means lets the refrigerant discharged from the compressor radiate heat in the radiator, decompresses the refrigerant by which heat has been radiated, and then lets the refrigerant absorb heat only in the heat absorber or in the heat absorber and the outdoor heat exchanger,
a dehumidifying and cooling mode in which the control means lets the refrigerant discharged from the compressor radiate heat in the radiator and the outdoor heat exchanger, decompresses the refrigerant by which heat has been radiated, and then lets the refrigerant absorb heat in the heat absorber, and
a cooling mode in which the control means lets the refrigerant discharged from the compressor radiate heat in the outdoor heat exchanger, decompresses the refrigerant by which heat has been radiated, and then lets the refrigerant absorb heat in the heat absorber,
the air-conditioning apparatus for vehicle selecting and executing these operation modes,
wherein the control means selects the operation mode in which a radiator target temperature is achievable by the heat radiation in the radiator.

2. The air-conditioning apparatus for vehicle according to claim 1,
wherein the control means selects each operation mode to start up, on the basis of an outdoor air temperature and a target outlet temperature, and
when the operation mode to be selected on startup is the dehumidifying and heating mode, the control means starts up in the heating mode in a case where the radiator target temperature is not achievable by the heat radiation in the radiator in the dehumidifying and heating mode.

3. The air-conditioning apparatus for vehicle according to claim 1,
wherein the control means selects each operation mode to start up, on the basis of an outdoor air temperature and a target outlet temperature, and
when the operation mode to be selected on startup is the dehumidifying and cooling mode, the control means starts up in the dehumidifying and heating mode in a case where the radiator target temperature is not achievable by the heat radiation in the radiator in the dehumidifying and cooling mode.

4. The air-conditioning apparatus for vehicle according to claim 1,
wherein the control means changes each operation mode on the basis of an outdoor air temperature and an outdoor air humidity, whether the heat radiation in the radiator becomes excessive or runs short, or whether the heat absorption in the heat absorber becomes excessive or runs short, and
when changing the operation mode, the control means allows the change of the operation mode on conditions that the radiator target temperature is achievable by the heat radiation in the radiator in the operation mode after shift.

5. The air-conditioning apparatus for vehicle according to claim 4,
wherein the control means shifts to the dehumidifying and heating mode on conditions that the radiator target temperature is achievable by the heat radiation in the radiator in the dehumidifying and heating mode, in a case where the outdoor air temperature and the outdoor air humidity rise in the heating mode.

6. The air-conditioning apparatus for vehicle according to claim 4,
wherein the control means shifts to the heating mode in a case where the outdoor air temperature lowers in the dehumidifying and heating mode or a case where the radiator target temperature is not achievable by the heat radiation in the radiator in the dehumidifying and heating mode.

7. The air-conditioning apparatus for vehicle according to claim 4,
wherein the control means shifts to the dehumidifying and cooling mode on conditions that the radiator target temperature is achievable by the heat radiation in the radiator in the dehumidifying and cooling mode, in a case where the heat absorption in the heat absorber runs short or a case where the heat radiation in the radiator becomes excessive, in the dehumidifying and heating mode.

8. The air-conditioning apparatus for vehicle according to claim 7, which has an internal cycle mode in which the control means obstructs inflow of the refrigerant into the outdoor heat exchanger and lets the refrigerant absorb heat only in the heat absorber in the dehumidifying and heating mode,
wherein the control means shifts to the internal cycle mode in a case where the heat absorption in the heat absorber runs short or a case where the heat radiation in the radiator becomes excessive, in the dehumidifying and heating mode, and
the control means shifts to the dehumidifying and cooling mode on conditions that the radiator target temperature is achievable by the heat radiation in the radiator in the dehumidifying and cooling mode, in a case where the heat absorption in the heat absorber further runs short or a case where the heat radiation in the radiator further becomes excessive, in the internal cycle mode.

9. The air-conditioning apparatus for vehicle according to claim 4,
wherein the control means shifts to the dehumidifying and heating mode in a case where the heat radiation in the radiator runs short in the dehumidifying and cooling mode or a case where the radiator target temperature is not achievable by the heat radiation in the radiator in the dehumidifying and cooling mode.

10. The air-conditioning apparatus for vehicle according to claim 9, which has an internal cycle mode in which the control means obstructs inflow of the refrigerant into the outdoor heat exchanger and lets the refrigerant absorb heat only in the heat absorber in the dehumidifying and heating mode,
wherein the control means shifts to the internal cycle mode in a case where the heat radiation in the radiator runs short in the dehumidifying and cooling mode or a case where the radiator target temperature is not achievable by the heat radiation in the radiator in the dehumidifying and cooling mode, and
the control means shifts to the dehumidifying and heating mode in a case where the heat radiation in the radiator runs short or a case where the heat absorption in the heat absorber becomes excessive, in the internal cycle mode.

11. The air-conditioning apparatus for vehicle according to claim 10, comprising:
an outdoor expansion valve which decompresses the refrigerant flowing into the outdoor heat exchanger,
wherein the control means controls a capability of the compressor on the basis of a temperature of the heat absorber and controls a valve position of the outdoor expansion valve on the basis of a temperature or a pressure of the radiator, in at least the dehumidifying and cooling mode,
the control means executes a radiator temperature prior mode to increase the capability of the compressor in a case where the heat radiation in the radiator runs short in the dehumidifying and cooling mode, and
the control means shifts to the internal cycle mode in a case where the heat radiation in the radiator runs short in the radiator temperature prior mode or a case where the radiator target temperature is not achievable by the heat radiation in the radiator in the dehumidifying and cooling mode.

12. The air-conditioning apparatus for vehicle according to claim 1,
wherein the control means has pieces of maximum radiator temperature data concerning a maximum radiator temperature that is achievable by the heat radiation in the radiator for at least each air volume of the radiator and outdoor air temperature in each of the dehumidifying and heating mode and the dehumidifying and cooling mode, and
on the basis of these pieces of the maximum radiator temperature data, the control means judges whether or not the radiator target temperature is achievable by the heat radiation in the radiator in the dehumidifying and heating mode and the dehumidifying and cooling mode.

* * * * *